United States Patent [19]

Freedman et al.

[11] Patent Number: 5,210,691
[45] Date of Patent: May 11, 1993

[54] METHOD AND APPARATUS FOR PRODUCING A MORE ACCURATE RESISTIVITY LOG FROM DATA RECORDED BY AN INDUCTION SONDE IN A BOREHOLE

[75] Inventors: Robert Freedman, Houston; Gerald N. Minerbo, Missouri City, both of Tex.

[73] Assignee: Schlumberger Technology Corporation, Houston, Tex.

[21] Appl. No.: 698,378

[22] Filed: May 9, 1991

Related U.S. Application Data

[63] Continuation of Ser. No. 521,049, May 8, 1990, abandoned.

[51] Int. Cl.$^5$ .......................... G01V 1/00; G01V 3/10
[52] U.S. Cl. ...................................... 364/422; 324/339
[58] Field of Search ................ 364/422, 421; 324/339, 324/323, 338; 73/151, 152

[56] References Cited

U.S. PATENT DOCUMENTS

| | | | |
|---|---|---|---|
| 3,179,879 | 4/1965 | Tanguy | 324/6 |
| 4,338,664 | 7/1982 | Mayer | 364/422 |
| 4,471,436 | 9/1984 | Schaefer et al. | 364/422 |
| 4,543,648 | 9/1985 | Hsu | 364/422 |
| 4,604,581 | 8/1986 | Thadari et al. | 364/422 |
| 4,755,944 | 6/1988 | Glass | 364/422 |
| 4,796,186 | 1/1989 | Kaufman | 364/422 |
| 4,808,996 | 2/1989 | Zimmer | 364/422 |
| 4,818,946 | 4/1989 | Barber . | |

OTHER PUBLICATIONS

"Basic Theory of Induction Logging and Application to Study of Two-Coil Sondes," Geophysics (1962) 27, No. 6, 829-858, Moran, J. H. and Kunz, K. S.

(List continued on next page.)

Primary Examiner—Roy N. Envall, Jr.
Assistant Examiner—Yuong Chung
Attorney, Agent, or Firm—Henry N. Garrana; John H. Bouchard

[57] ABSTRACT

A maximum entropy method (MEM) determines a more accurate formation parameter profile, such as conductivity profile, of a formation. The MEM method employs an iterative procedure for determining the formation parameter profile. At each interation, theoretical logs are computed and compared with the measured log data. One iterative step is the calculation of a forward model to predict the response of the tool in a given assumed formation. Another iterative step is the solution of a set of linear equations to update the assumed formation parameter in the formation to produce closer agreement to the measured data. In a solution iterative step, the input is the measured values of the voltages denoted by $V_k{}^j$ and the calculated values $\bar{V}_k{}^j$, the output is an improved formation parameter profile $\sigma_i{}^{(n+1)}$. In the solution step, a set of linear equations is solved for intermediate quantities $q_i{}^{(n)}$, related to $\sigma_i{}^{(n)}$ by the formula $$\sigma_i{}^{(n)} = \pi \exp(q_i{}^{(n)}),$$

where $\pi$ is a constant. Upon completion of the solution step, the updated formation parameter profile $\sigma_i{}^{(n+1)}$ is stored and the following inequality is tested to determine if it be true or not true:

$$|\sigma_i{}^{(n+1)} - \sigma_i{}^{(n)}|/\sigma_i{}^{(n)} << \epsilon,$$

where $\epsilon$ is a very small value. If the above inequality is true, the MEM software terminates its processing, whereas if the inequality is not true, n is incremented by 1, and another pass of the iterative process is performed. The process repeats iteratively until the above-cited inequality is true. The formation parameter profile of the formation is selected to be the updated formation parameter profile $\sigma_i{}^{(n+1)}$ which satisfies the above-cited inequality.

7 Claims, 14 Drawing Sheets

——— IM RESPONSE FUNCTION
- - - - ID RESPONSE FUNCTION

......... MEM WITHOUT BED INPUT    - - - - - - ILM
——— $R_t$                                    —·—·— ILD $\alpha = 1, \quad \beta = 2$

- - - - MEM WITHOUT BEDS
———— $R_t$
·········· RAW DOLL ID SIGNAL $\lambda = 0.02$
$\gamma = 0$ ·········· MEM WITHOUT BEDS IMPUT     - - - - IMER
———— $R_t$                              —·—· IDER $\alpha = 1, \beta = 2$ --- MEM WITHOUT BEDS
— Rt
......... RAW DOLL ID SIGNAL $\lambda = 0.02, \gamma = 0$

METHOD AND APPARATUS FOR PRODUCING A MORE ACCURATE RESISTIVITY LOG FROM DATA RECORDED BY AN INDUCTION SONDE IN A BOREHOLE

This is a continuation of application Ser. No. 07/521,049 filed May 8, 1990 now abandoned.

BACKGROUND OF THE INVENTION

The subject matter of the present invention pertains to a numerical algorithm and software program executed in a computer for determining an improved conductivity profile of a formation from data recorded by an induction sonde in a borehole where well logging or other such operations are being performed.

The primary goal of induction logging is to obtain an accurate determination of the profile of the true conductivity (or its inverse the resistivity) of the earth formations surrounding the borehole. In particular, it is desired to obtain a high resolution reconstruction or image of the true formation resistivity (denoted by $R_t$) profile including accurate resistivity values in thin beds (e.g. 2 foot-thick strata) which are frequently encountered in oil and gas wells. Modern induction tools, such as the tool described in U.S. Pat. No. 3,179,879 to Tanguy, have focussed multi-coil arrays and measure both the R-signal (in-phase) and X-signal (quadrature) components of the formation signal. It is also desirable to have at least two different radial depths of investigation including a deep array (ID) and a medium (IM) array. The arrays with different radial depths of investigation detect and correct for environmental effects such as the influence of the borehole and the invasion into the formation of fluids from the borehole. This requirement necessitates having arrays with relatively long transmitter-receiver spacings since borehole fluid invasion of sixty inches more is not uncommon. Thus, for example the ID array is designed to be able to see beyond the invaded zone and to have a signal representative of the virgin formation. Unfortunately, there is, with increasing depth of investigation in the radial direction, a loss of vertical resolution. That is, the instrumental induction tool vertical response functions have poor vertical resolution. The ID and IM vertical response functions in a homogeneous medium with infinite resistivity are known as geometrical factor or Doll response functions. In wells penetrating very low conductivity rock formations, the raw induction tool response for the ID and IM arrays, in the absence of invasion and neglecting the borehole, can be obtained by convolving the formation conductivity profile with the Doll response functions shown in FIG. 3. Ideally, it would be desirable for the tool vertical response functions to be very localized spatially (i.e., to be mathematically described by Dirac delta functions) about a central peak with no sidelobes so that the raw tool response would be the true formation conductivity profile. Another difficulty is that the induction tool response functions depend on the formation conductivity in a non-linear fashion. This has the effect that, even in homogeneous media, the vertical response functions change shape and spatial extent depending on the background conductivity. In a homogeneous medium, in the limit of formation conductivity approaching zero, the induction tool R-signal is proportional to the formation conductivity. As the formation conductivity increases, the R-signal increases less rapidly than the formation conductivity. This non-linear dependence on formation conductivity is known by those skilled in the art as skin effect.

Traditional induction log signal processing methods have exploited the approximate linearity of the induction tool response on formation conductivity by constructing linear inverse filters whose convolution with the tool response function produces a filtered response function which is more spatially localized (i.e., has a narrower central peak) and has reduced sidelobes. The spatial localization of the filtered response function provides better resolution whereas the reduced sidelobes suppress the shoulder effect. The shoulder bed effect generally occurs in resistive beds which are adjacent to more conductive beds. One of the purposes of inverse filters is to reduce the shoulder bed effect. Traditional induction log signal processing is based on simple inverse filters which have been used commercially in the well-logging industry for about forty years. The induction logs obtained by applying these filters to the raw measured log data are denoted by ILD (induction log deep) and ILM (induction log medium). The ILD curve is obtained by applying a three-point deconvolution filter and skin-effect boosting correction to the measured log data. The ILM curve simply involves a skin-effect boosting correction to the raw data. In FIG. 4, the ILD and ILM processed logs are illustrated. Note that the ILD and ILM curves show significant shoulder effects in all of the beds. The shoulder effect is often the main reason that the ILD and ILM curves do not read the true bed resistivities.

The maximum entropy method (MEM) has recently been used in many fields of science and engineering to obtain inversions of instrumentally blurred and noisy data. It has proved to be an especially powerful technique in image reconstruction and pattern recognition problems. It has also been used in exploration geophysics to process seismic data. It has not to data been commercially utilized in the well-logging industry. A recent article published by Dyos in "SPWLA transactions", 1987, applied the maximum entropy method to the inversion of R-signal data from the ID array. The inversions obtained by Dyos using this algorithm exhibited spurious oscillations at the blind frequencies of the ID array, as shown in FIG. 5. The present invention removes these spurious oscillations in the reconstructions obtained by Dyos.

More recent advances in induction log signal processing, such as the advances discussed in U.S. Pat. No. 4,471,436 issued to Schaefer et al., have developed filters which use the measured X-signals to improve the skin-effect correction. In spite of significant advances during the past decade in induction tool technology and inverse filter design, there are intrinsic limitations to the vertical resolution achievable without the risk of producing spurious artifacts and instabilities on the deconvolved conductivity profile.

Other approaches to induction log signal processing have used forward modeling and criteria such as least squares inversion to iteratively determine model parameters describing the formation conductivity profile. This approach is known as a parametric inversion because it assumes a specific model for the formation conductivity profile. A model with a step profile is often used. However, this approach has its limitations, that is, if the actual formation does not conform to the assumed model, the conductivity values determined from a parametric inversion can be very far from the truth. The maximum entropy method described in this application is not a parametric inversion; rather, it is similar to methods used in image reconstruction of instrumentally blurred and noisy data. The maximum entropy method attempts to extract all the information that can be safely extracted from the data. Its objective is to improve the resolution and accuracy of the estimated $R_l$, but give results that are stable and reliable.

SUMMARY OF THE INVENTION

Therefore, a primary object of the present invention is to provide a new more efficient maximum entropy method (MEM) which requires significantly fewer iterations to achieve convergence of the MEM algorithm as compared to other prior art methods thereby further providing a practical implementation of the method with modest computational facilities.

In accordance with this and other objects of the present invention, the maximum entropy method (MEM) of the present invention for determining a more accurate conductivity profile of a formation discretizes the formation conductivity into pixels or elements. The conductivity in each pixel is determined by the maximum entropy method steps that are implemented by the conductivity profile software of the present invention. The maximum entropy method finds the most stable and most probable solution consistent with the measured data. In addition, the MEM inversions obtained using the methods disclosed in this application also lead to significant improvements in accuracy and resolution compared to the results presented by Dyos of FIG. 5 and described in the "SPWLA Transactions", 1987, referenced in the background section of this application. The improvements result from the development of a new methodology for implementing the MEM of inversion. This new methodology is based on optimization of a new Lagrangian functional, $L_2$, which is discussed below. Optimization of the new functional leads to improved MEM inversions and is more efficient than the MEM methods which are based on a functional $L_1$. The improved efficiency of the new algorithm lends itself to the use of an exact forward model in the MEM inversion. That is, the MEM method employs an iterative procedure for determining the formation conductivity profile. At each iteration, theoretical logs are computed and compared with the measured log data. The theoretical logs are computed using the exact tool model (e.g., a finite element or other solution of Maxwell's equations) based on a conductivity distribution which has evolved during the iteration process from an initial distribution used to start the iteration process. The computation of the theoretical logs using an exact forward model (or an accurate approximation to an exact forward model) is an essential ingredient in obtaining accurate, robust and high resolution inversions, fully corrected for skin effect and should bed effects. Another improvement results from the capability of simultaneously processing several channels of data, for example the input data can consist of the R-signal as well as the X-signal of both the IM and ID arrays. Also the method permits the use of a smoothing parameter $\beta$ in the functional $L_1$, which serves to reduce unwanted oscillations.

The maximum entropy method (MEM) steps of the present invention are implemented by the conductivity profile software when executed by a computer (e.g., a well logging truck computer). The software, when executed by the computer, performs an iterative process where basic steps are repeated several times. One step is the calculation of a forward model to predict the response of the tool in a given assumed formation. Another step is the solution of a set of linear equations to update the assumed conductivity in the formation to produce closer agreement to the measured data. The estimate of the conductivity in the lth pixel at the nth iteration is denoted by $\sigma_l^{(n)}$. In the calculation of the forward model, the input is the conductivity profile $\sigma_l^{(n)}$; the output is the computed voltages for channel j at the kth sample of the log data, denoted by $\tilde{V}_k^j$. In the solution step, the input is the measured values of the voltages denoted by $V_k^j$ and the calculated values $\tilde{V}_k^j$, the output is an improved conductivity profile $\sigma_l^{(n+1)}$. This improved conductivity profile, $\sigma_l^{(n+1)}$, when used in the forward model, will result in voltages $\tilde{V}_k^j$ which are in closer agreement with the measured voltages $V_k^j$. In the solution step, a set of linear equations is solved for intermediate quantities $q_l^{(n)}$, related to $\sigma_l^{(n)}$ by the formula $$\sigma_l^{(n)} = \pi \exp(q_l^{(n)}),$$

where $\pi$ is a constant. Here "exp" denotes the exponential function.

Upon completion of the solution step, the updated conductivity profile $\sigma_l^{(n+1)}$ is stored and the following inequality is tested to determine if it be true or not true:

$$|\sigma_l^{(n+1)} - \sigma_l^{(n)}|/\sigma_l^{(n)} << \epsilon,$$

where $\epsilon$ is a very small value. If the above inequality is true, the MEM software terminates its processing, whereas if the inequality is not true, n is incremented by 1, and another pass of the iterative process is performed. The process repeats iteratively until the above-cited inequality is true. The conductivity profile of the formation is selected to be the updated conductivity profile $\sigma_l^{(n+1)}$ which satisfies the above-cited inequality.

The conductivity profile thus determined has the maximum entropy consistent with the measured data. This is described fully in the detailed description of the preferred embodiment. The method also has a built in self-consistency check. This check uses the tool forward model and the conductivity profile determined by the maximum entropy method to compute theoretical logs. The self-consistency of the method is determined by comparing the theoretical logs with the measured logs. An example of how the self-consistency check can be used to assess the validity of the computed conductivity profile as well as the data quality is discussed in the detailed embodiment. It should also be apparent that the method described herein is not limited to determining conductivity or resistivity profiles from induction log data. It can also be applied to a formation parameter such as, for example, the bulk density profile of the formation which could be determined by using the method of this specification applied to data from a gamma-gamma density or other similar nuclear logging tool.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DESCRIPTION OF THE PREFERRED EMBODIMENT

Figure 1:
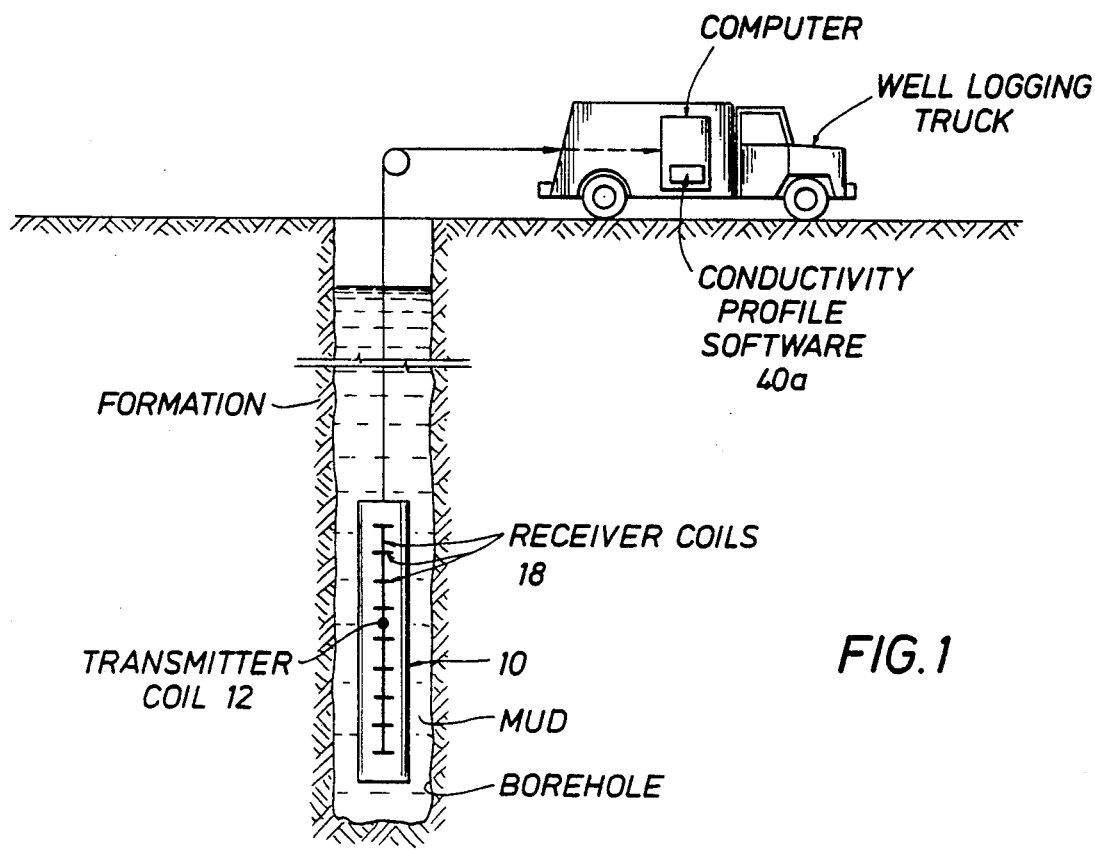
FIG. 1 illustrates a well-logging tool disposed in a borehole and connected to a well-logging truck at a well surface, the truck containing a computer in which the MEM conductivity inversion software of the present invention is stored.

Referring to FIG. 1, a formation traversed by a borehole is adapted to receive a well-logging tool, such as an induction tool 10 containing a transmitter 12 and a plurality of receivers 18. The tool 10 is connected to a well-logging truck contains a computer, the computer storing in memory the MEM conductivity inversion software 40a in accordance with the present invention.

Figure 2:
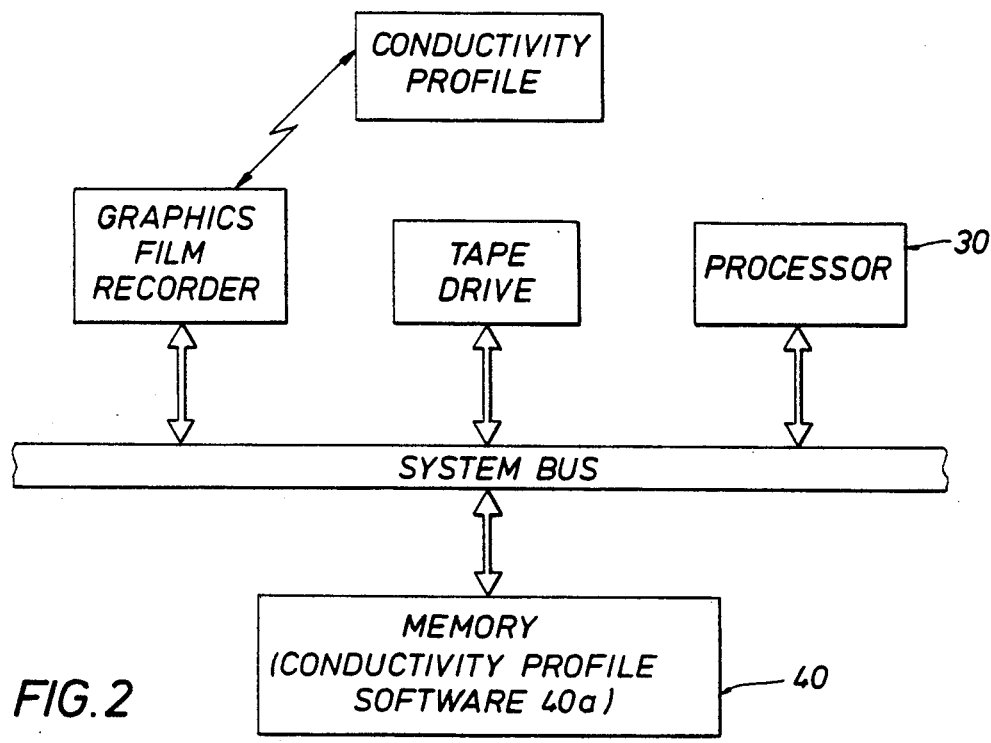
FIG. 2 illustrates a construction of the computer of FIG. 1, the computer containing a memory in which the MEM conductivity inversion software is stored.

Referring to FIG. 2, the well truck computer comprises a system bus, to which a processor 30 and a memory 40 is attached. The memory 40 stores the MEM conductivity inversion software 40a in accordance with the present invention. A tape drive is connected to the system bus, and a graphics film recorder peripheral is also connected to the system bus, the recorder generating a formation resistivity log for presentation to a customer.

Figure 3:
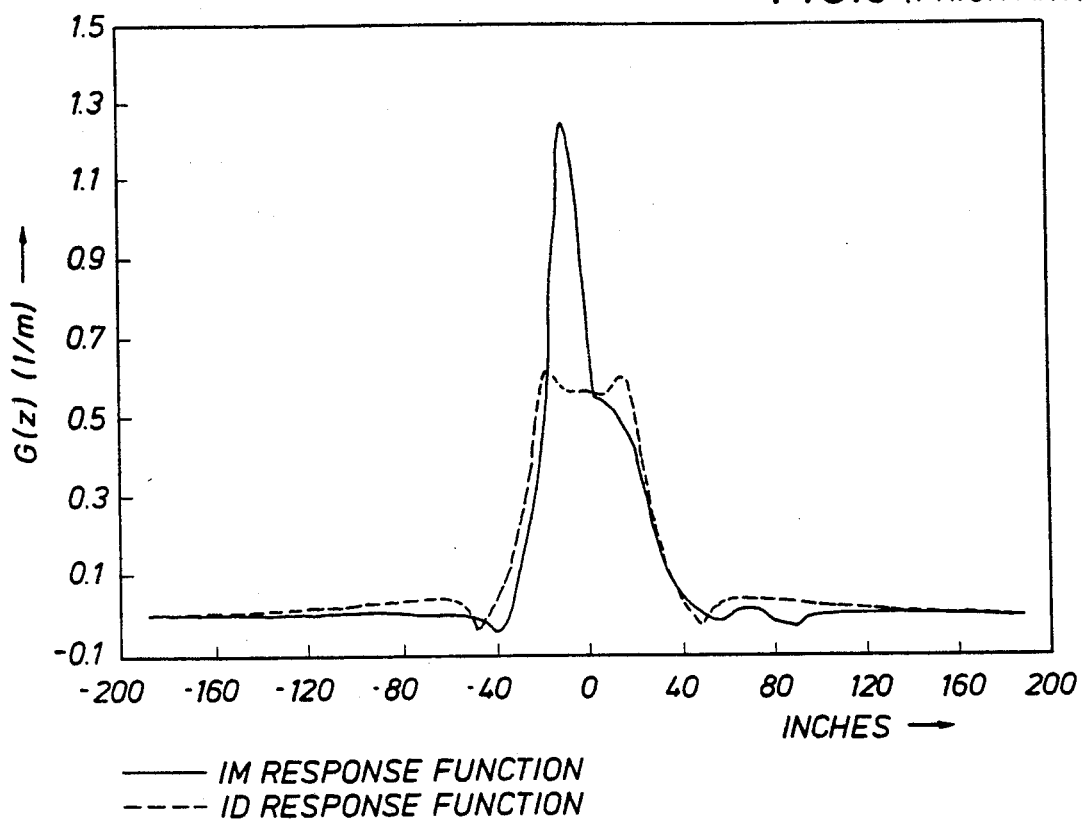
FIG. 3 illustrates Doll response functions which are convolved with a formation conductivity profile yielding a raw induction tool response function for medium and deep arrays.
Figure 4:
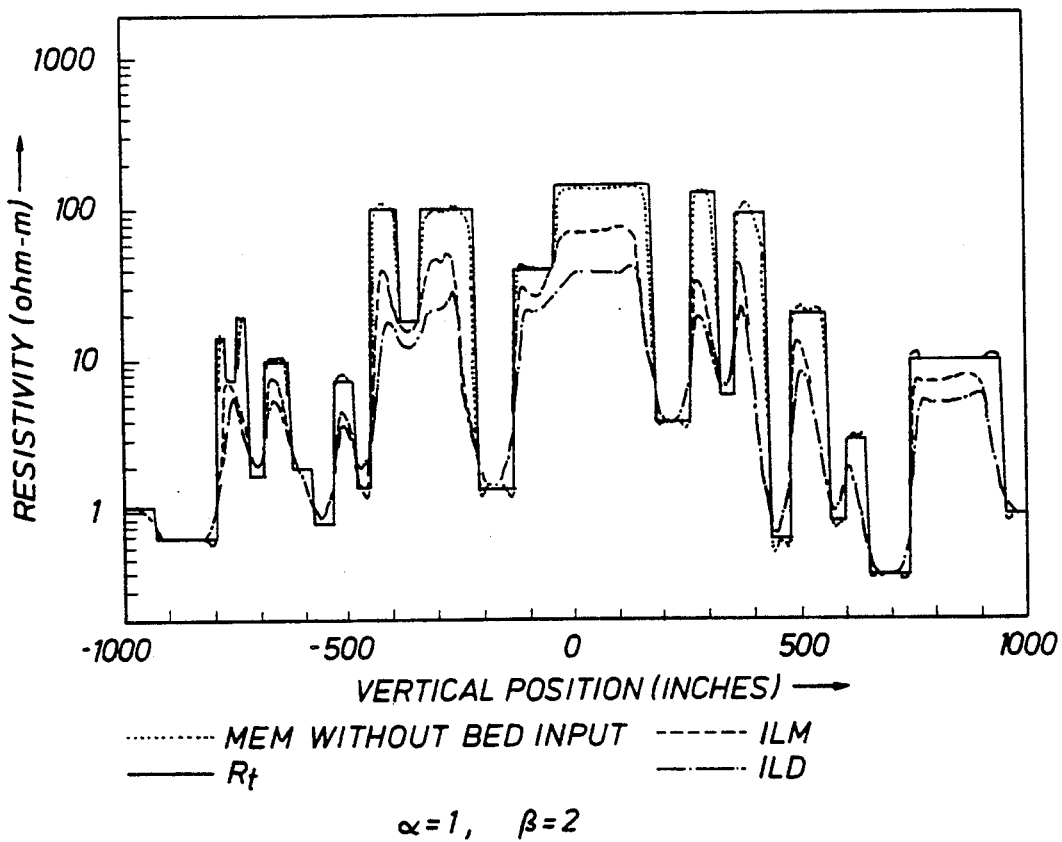
FIGS. 4 and 5 illustrate comparisons of prior art conductivity profiles with a true resistivity ($R_t$) profile.
Figure 5:
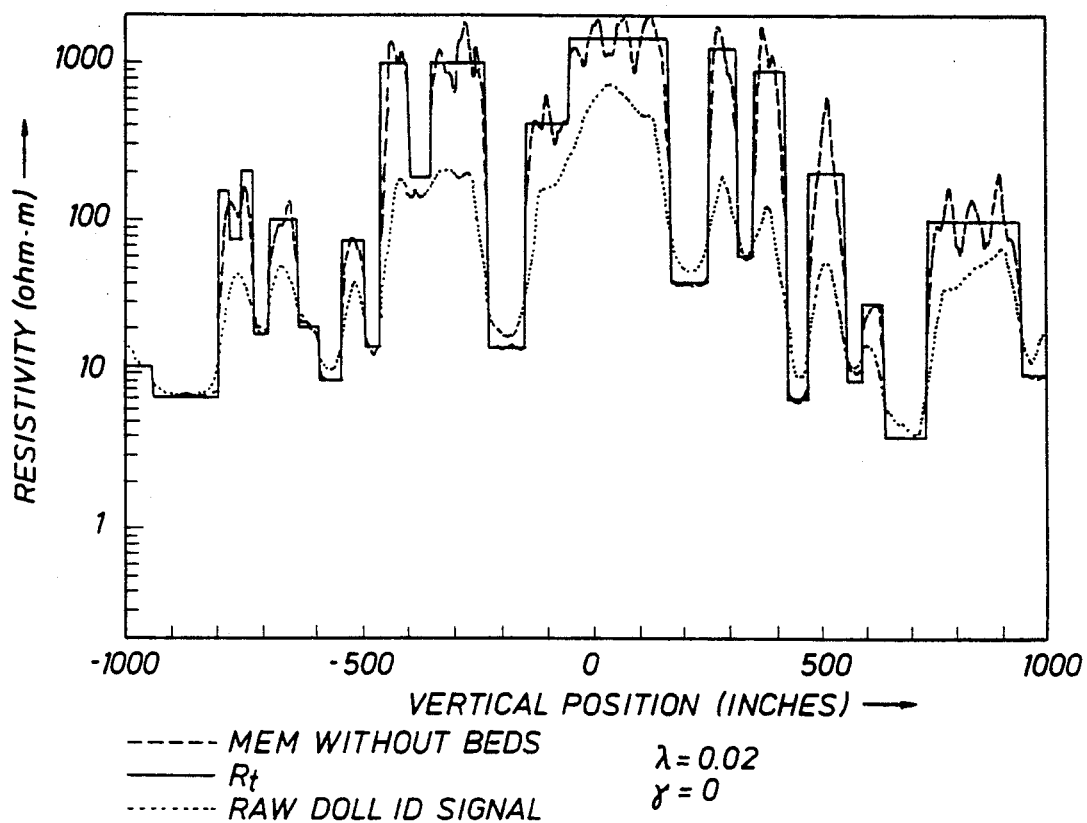

FIGS. 3 through 5 were discussed in the background of the invention section of this specification.

Figure 6:
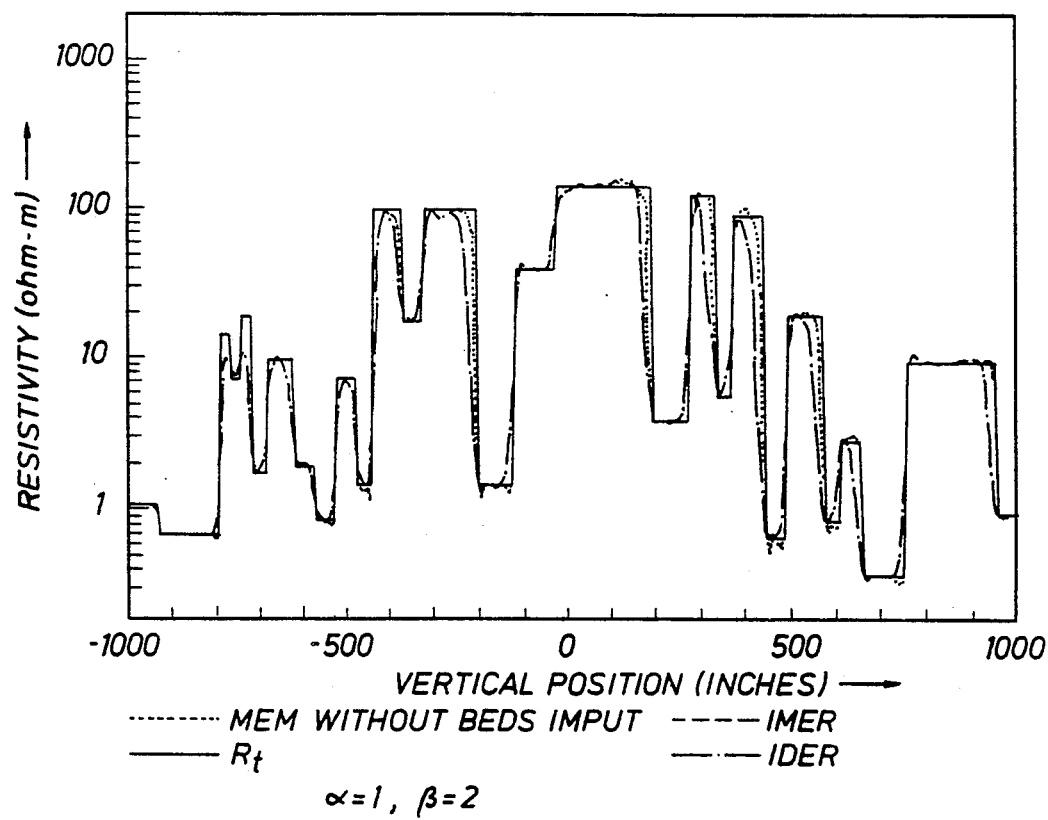
FIG. 6 illustrates a comparison of more recent prior art conductivity profiles (IMER and IDER) and a resistivity profile (MEM) determined by use of the present invention with the true resistivity profile ($R_t$)

Referring to FIG. 6, a comparison of more recent prior art conductivity profile logs (IMER and IDER) and a MEM inversion resistivity log by use of the present invention with a true resistivity profile ($R_t$) is illustrated.

FIG. 6 illustrates a comparison of conductivity profiles associated with state-of-the-art commercial inverse filters, known as Induction Deep Enhanced Resolution (IDER) and Induction Medium Enhanced Resolution (IMER) with a true resistivity profile of a borehole formation; and further illustrates a comparison of the conductivity profile produced maximum entropy method (MEM) inversion software of the present invention with the same true resistivity profile ($R_t$) of the formation under investigation. Note that, although the IDER and IMER filter processed logs have a significantly improved shoulder bed effect and resolution as compared with the traditional ILD and ILM of the FIG. 4 logs, the MEM inversion of the present invention has superior resolution compared to the filter processed logs. In particular, note that the three two-foot beds are accurately reconstructed by the MEM inversion whereas the IDER and IMER logs fail to accurately reconstruct these thin beds. Also note that the MEM inversion is able to follow more accurately the large changes in true formation resistivity at the bed boundaries.

Figure 7:
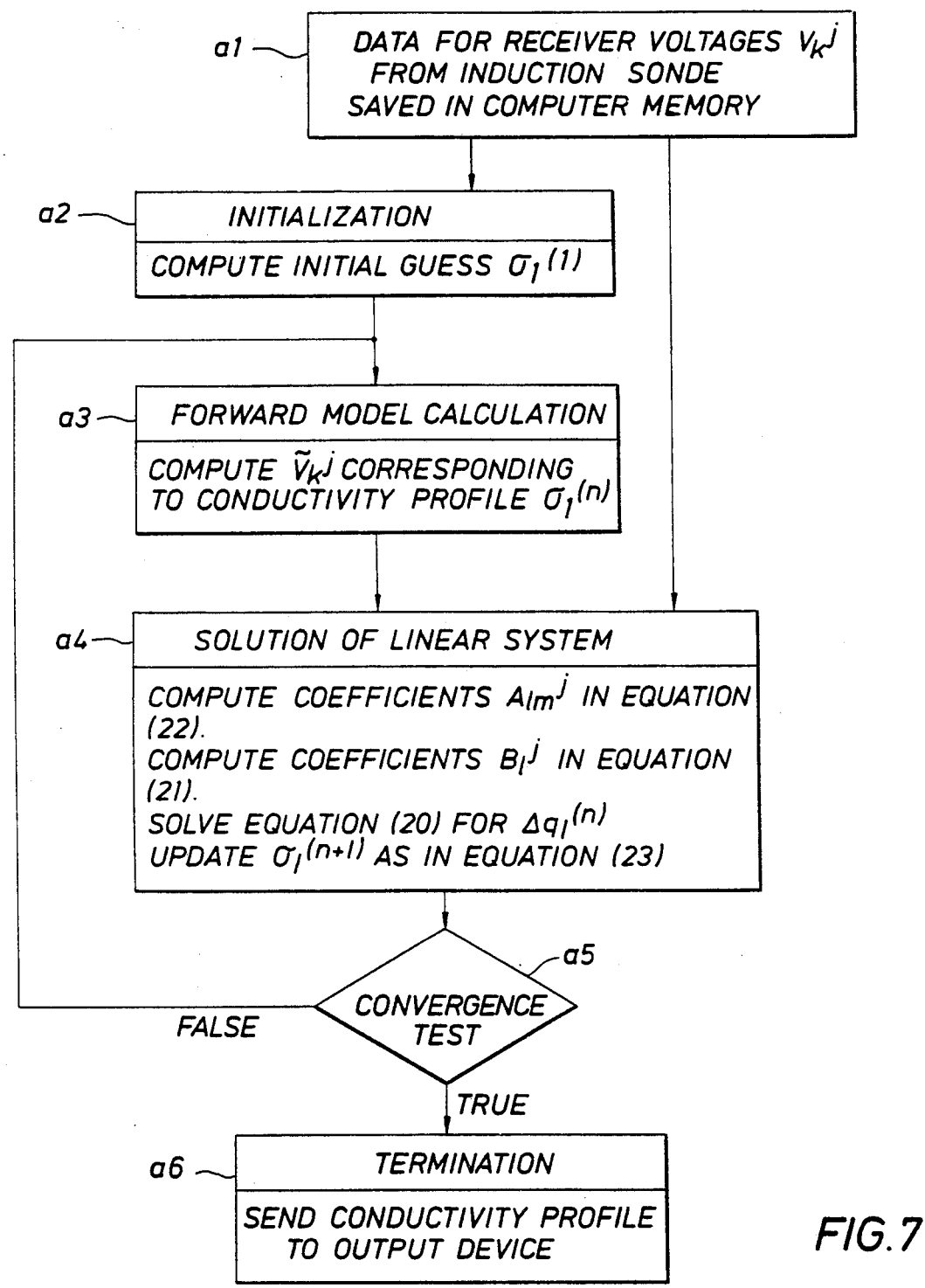
FIG. 7 illustrates a flowchart of the MEM software in accordance with the present invention.
Figure 8:
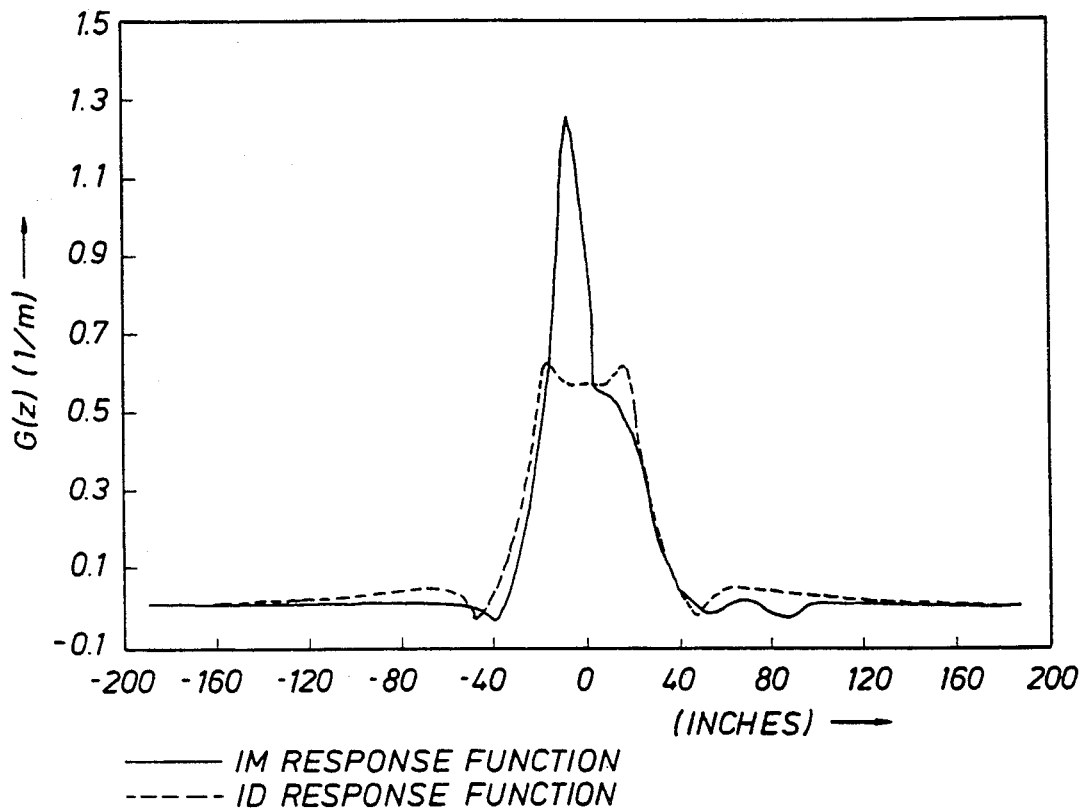
FIG. 8 illustrates induction deep (ID) and induction medium (IM) vertical response functions.
Figure 9:
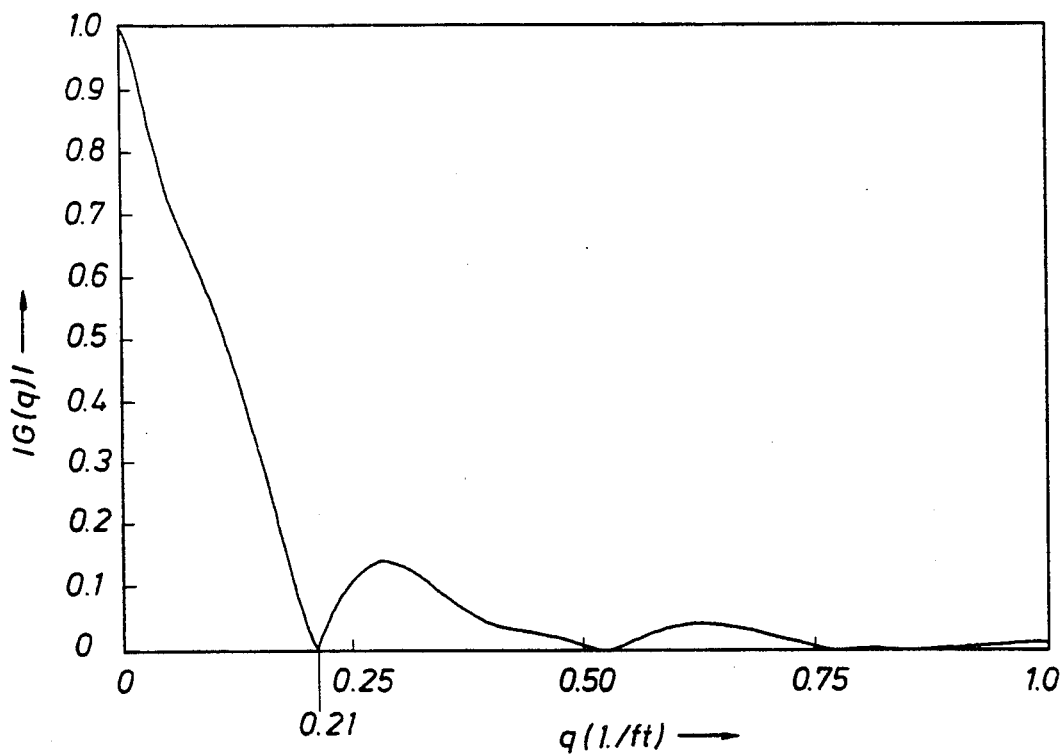
FIG. 9 illustrates amplitude of induction deep (ID) Fast Fourier Transform (FFT) spectrum.
Figure 10:
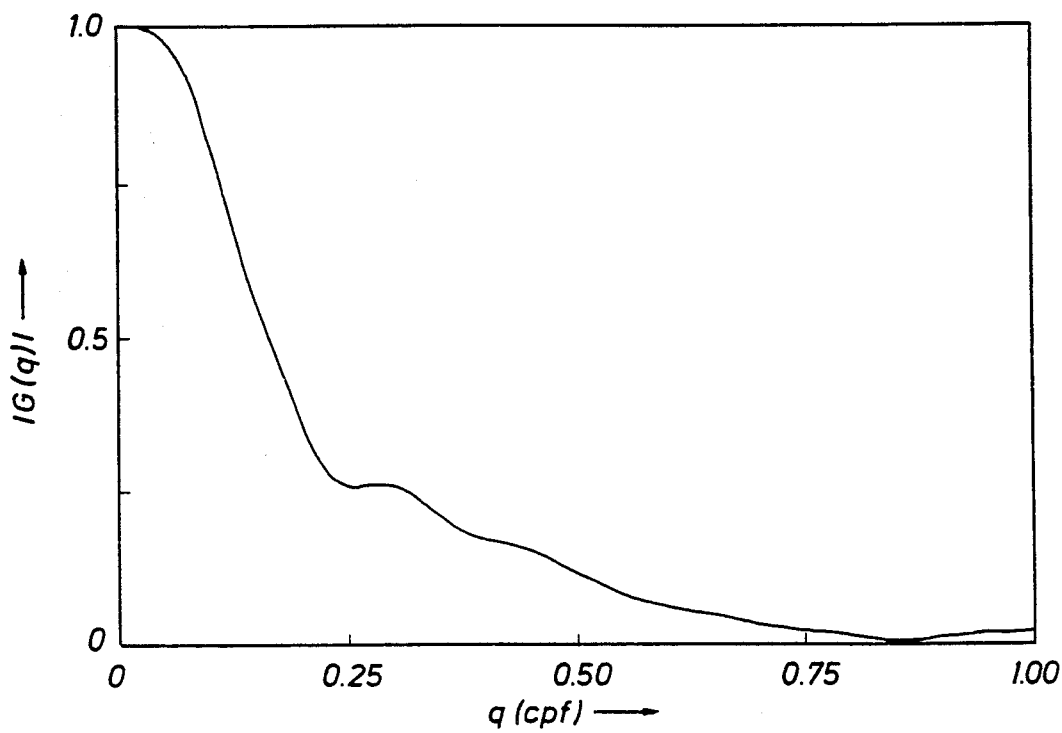
FIG. 10 illustrates amplitude of induction medium (IM) FFT spectrum showing no blind frequencies.

Referring to FIG. 7, a flowchart of the MEM conductivity inversion software 40a in accordance with the present invention is illustrated.

In FIG. 7, the data for the voltages $V_k{}^j$ recorded by the induction sonde 10 are stored in the computer memory 40, block a1 of FIG. 7. During the initialization phase, block a2, the voltages $V_k{}^j$ are examined and an initial estimate $\sigma_1{}^1$ of the formation conductivity profile is produced, where the lower case letter "s" is being used, in addition to the lower case greek letter "sigma", to designate the formation conductivity. The forward model calculation is represented by block a3 in FIG. 7. In block a3, the input is the current estimate of the conductivity profile $\sigma_1{}^{(n)}$, and the output consists of channel voltages $\tilde{V}_k{}^j$ computed from the model. Block a4 of FIG. 7 depicts the solution phase. The input for block a4 consists of the measured voltages $V_k{}^j$ and computed values of $\tilde{V}_k{}^j$. The difference between measured voltages $V_k{}^j$ and computed values $\tilde{V}_k{}^j$ is used to compute the coefficients $A_{lm}{}^j$ and $B_l{}^j$ in equations (22) and (21) hereinbelow. Using the computed coefficients, the linear equations specified in equation (20) of the next section are set up and then solved for the quantity Delta $q_1{}^{(n)}$. The updated conductivity profile $\sigma_1{}^{(n+1)}$ is then computed as in equation (23) of the text section from the current estimate of the conductivity profile $s_1{}^{(n)}$ and the quantity Delta $q_1{}^{(n)}$. A complete and thorough discussion of these equations is set forth in the next section of this specification, entitled "Detailed Description of the Preferred Embodiment".

When the update conductivity profile and the current estimate of the conductivity profile are both known, a convergence test is performed, block a5 of FIG. 7. When the convergence test is performed, the following inequality is tested:

$$|\sigma_1{}^{(n+1)} - \sigma_1{}^{(n)}|/\sigma_1{}^{(n)} << \epsilon,$$

where $\epsilon$ is a very small number. If this condition is not true, increment n by 1, save $\sigma_1{}^{(n+1)}$, then go to block a2 of FIG. 7 and start another iteration; otherwise, if true, then exit from the loop and send the conductivity profile $\sigma_1{}^{(n+1)}$ to the output device (magnetic tape unit), block a6. Upon exit from block a6, $\sigma_1{}^{(n+1)}$ is the best available estimate of the conductivity in the formation. When this profile is converted to resistivity units and plotted (on the graphics film recorder), the result is a high-resolution resistivity log similar to the curve labelled "MEM" in FIG. 6.

DETAILED DESCRIPTION OF THE PREFERRED EMBODIMENT

To apply the MEM to induction log inversion, one constructs a Lagrangian functional $\pounds\{\sigma(z)\}$ of the formation conductivity. Note that a functional is a single number whose value depends on the value of a function at all points in the domain of interest. In this specification we will denote functionals by enclosing their argument functions in curly braces. The dependence of ordinary functions on their variables is denoted by enclosing the variables in parentheses. Here we are assuming a 1-D vertical variation in the formation conductivity. In general, of course, the formation conductivity $\sigma(\vec{r})$ is an arbitrary function of position in the formation. A standard Lagrangian functional used in MEM inversion applications can be written in the form, $$\pounds_1\{\sigma(z)\} = -S\{\sigma(z)\} + \lambda\chi^2\{\sigma(z)\}, \quad (1)$$

where the entropy (i.e., a functional of $\sigma(z)$) is given by $$S\{\sigma(z)\} = -\int_{-\infty}^{\infty} dz \frac{\sigma(z)}{T}\left[\ln\frac{\sigma(z)}{\pi(z)} - 1\right], \quad (2)$$

where T is the integrated sum of the conductivity distribution, i.e., $$T = \int_{-\infty}^{\infty} dz\sigma(z), \quad (3)$$

and $\pi(z)$ is an initial or prior distribution of conductivity which we shall take to be a uniform distribution. The second term in Eq. 2 is a chi squared statistic that describes how well the forward model fits the measured data. The chi squared term can be written in the form, $$\chi^2 = \sum_j \int_{-\infty}^{\infty} dz[W_{j,R}(z)[ReR_j(z)]^2 + W_{j,X}(z)[ImR_j(z)]^2], \quad (4)$$

where $ReR_j(z)$ and $ImR_j(z)$ are real and imaginary parts of the complex residuals which are defined by $$R_j(z) = V_j(z) - \tilde{V}_j(z), \quad (5)$$

where $V_j(z)$ are the complex measured voltages from the j-th array at measured depth z. The measured voltages contain formation signal plus noise. The $\tilde{V}_j(z)$ are the voltages computed from the forward model for a given distribution of formation conductivity. In Eq. 4 the $W_{j,R}$ and $W_{j,X}$ are weights for the R and X signals, respectively. The weights are the inverse variances in the measured data. The parameter $\lambda \geq 0$ in Eq. 1 is a Lagrange multiplier. It can be shown from statistical arguments that the expectation value of $\chi^2$ in the presence of random noise is approximately equal to the number of degrees of freedom (denoted by $N_f$) in the data. Therefore $\lambda$ is selected in practice so that the final solution has $\chi^2 \approx N_f$. Application of the maximum entropy principle requires minimization of the Lagrangian functional in Eq. 1. In the presence of noisy data, there are in general many conductivity distributions $\sigma(z)$ which will fit the data to within the uncertainty imposed by the noise. The maximum entropy principle selects from this set that unique distribution which maximizes the entropy. It can be shown from the properties of the functional in Eq. 2, that the maximum entropy solution is the most uniform or flattest solution consistent with the data. The minimization of the Lagrangian functional (note that minimizing $-S$ is equivalent to maximizing S) in Eq. 1 is a nonlinear optimization problem.

The minimization is done by first discretizing the unknown formation conductivity distribution into N elements or pixels. In 1-D, for 6-in. data samples, inverting 100 ft of log requires solving for 200 unknowns. There are very few commercially available algorithms which can efficiently handle nonlinear optimization problems with this many unknowns. To solve this problem, we developed a conjugate gradient algorithm, discussed in a later section, to perform the minimization. This algorithm proved useful for studying MEM inversions of synthetic data based on a Born approximation forward model.

For inverting field log data, the assumptions underlying the Born approximation are frequently not valid. In these situations an exact forward model (i.e., a 1-D finite element solution to Maxwell's equations in a layered medium) is employed in the inversion. It has been found that the aforementioned algorithm is too inefficient (i.e., requires too many iterations) to be used with the exact forward model. Therefore, a second MEM algorithm based on a new Lagrangian functional was employed to invert the field data. This new algorithm is based on the functional $$\mathcal{L}_2 = -\alpha S\{\sigma(z)\} + \chi^2\{\sigma(z)\} + \beta \int_{-\infty}^{\infty} dz \left(\frac{d\ln\sigma(z)}{dz}\right)^2, \quad (6)$$

where $\alpha \geq 0$ and $\beta \geq 0$ are adjustable parameters and the entropy $S\{\sigma(z)\}$ and chi squared $\chi^2\{\sigma(z)\}$ functionals were defined in Eqs. 2 and 4, respectively. The last term in Eq. 6 is a logarithmic smoothing term. The conductivity distribution which minimizes $\mathcal{L}_2$ is determined iteratively by a quasi-Newton method. The algorithm we use is briefly described in the section below called Summary of Optimization Algorithms.

Inclusion of Bed Boundary Information

In this section we describe an extension of the MEM method which permits the inclusion of bed boundary information into the inversion. This extension of the MEM method is, strictly speaking, contrary to the spirit of the conventional MEM formalism. Nevertheless for applications to well logging, it is useful to investigate the effects on inversion if one has a priori knowledge (e.g., from other logs) of the bed interface positions. Bed boundary information is exploited by forcing the conductivity to be approximately constant in the interior of each bed. One can incorporate knowledge of bed boundary positions by adding a term $\mathcal{L}_1'$ to the Lagrangian in Eq. 1. The discretized form of $\mathcal{L}_1'$ can be written in the form, $$\mathcal{L}_1' = \frac{\gamma}{2} \sum_{j=1}^{N_b} \sum_{n=1}^{N_j-1} (\sigma_{n+1} - \sigma_n)^2 \equiv \frac{\gamma}{2} \sum_{j=1}^{N_b} \sum_{nm} H_{mn}^j \sigma_m \sigma_n, \quad (7)$$

where the parameter $\gamma \geq 0$. This term penalizes changes in conductivity within a bed. This type of term is frequently used to regularize or improve the condition number of inverses of response functions which are ill-conditioned. It is also used as a constraint to force smoothness and we shall refer to the parameter $\gamma$ as a smoothing parameter. In the double summation we first sum over the conductivity pixels in the j-th bed and then sum over all $N_b$ beds. It is convenient to write this as a quadratic form $(\vec{\sigma}|H\vec{\sigma})$. Here $\vec{\sigma} = (\sigma_1, \sigma_2, \ldots, \sigma_N)^T$ is a vector containing N discretized conductivity elements in the interval of interest. H is a N×N real symmetric tridiagonal (because the coupling is next nearest neighbors only) matrix. Since there is no coupling across bed boundaries, H can be written as partitioned block matrix where each block represents a bed. The form of the matrix H for a single bed is well known and can be easily derived.

Born Approximation Forward Modeling

As noted earlier, iterative inversion methods require repeated solution of a forward model. In induction logging problems, an approximate forward model which is accurate for some applications can be obtained from the Born approximation. The Born approximation assumes small departures from a homogeneous medium with an appropriately chosen background conductivity, $\bar{\sigma}^j(z)$. Note that the background conductivity in general depends on the array and the tool position, however, we shall suppress this dependence in order to simplify the notation. The Born approximation can be thought of as a generalized geometrical factor theory which includes propagation effects. The Born approximation represents the first order correction in an infinite series in powers of $\delta\sigma = \sigma - \bar{\sigma}$. If the inhomogeneities are strong (corresponding to large contrasts in formation conductivities) then the approximation will break down. One should then use an exact forward model which is a solution to Maxwell's equations in a layered medium with an arbitrary formation conductivity distribution. The advantage of the Born approximation is that it is computationally quick compared to a full solution of Maxwell's equations. The Born approximation can be used, as discussed in the next section, to accelerate the iterative algorithm for the full forward model. In the Born approximation the forward model is written in the form, $$\tilde{V}_j(z;\bar{\sigma}) = \tilde{V}_{h,j}(\bar{\sigma}) + \int_{-\infty}^{\infty} d\bar{z} K^j(\bar{z} - z;\bar{\sigma})(\sigma(\bar{z}) - \bar{\sigma}), \quad (8)$$

where $\tilde{V}_j(z;\bar{\sigma})$ is the computed voltage for the j-th array and where $\bar{\sigma}$ is an average background conductivity that is determined for each array at each position of the tool. The first term in Eq. 8 is the response of the j-th array in a homogeneous medium with conductivity $\bar{\sigma}$ and the second term accounts for departures from the background conductivity. The Born kernel or response function $K^j(z;\bar{\sigma})$ is a generalized geometrical factor. It is identical to the Doll geometrical factor for zero background conductivity. For numerical computations, we use the discretized version of Eq. 8 which is written in the form, $$\tilde{V}_k^j(\bar{\sigma}) = V_h^j(\bar{\sigma}) + \Delta \sum_{n=1}^{N} k_{n-k}^j(\sigma_n - \bar{\sigma}), \quad (9)$$

where $\Delta$ is the data sample spacing. Here the index n denotes the position of a conductivity element in the formation whereas k denotes the measured depth of the measure point of the j-th array.

Summary of Optimization Algorithms

In this section we first describe the conjugate gradient (CG) algorithm which is used to minimize the Lagrangian functional in Eq. 1. An attractive feature of the CG algorithm is that its implementation requires less memory than Newton-like methods. This feature becomes more important for applications to very large problems in two and three dimensions where the number of unknowns can be of the order of $10^6$.

To solve a problem in N unknowns using the CG method requires storage at each iteration of three vectors of length N. These are the solution vector $\vec{\sigma}^{(n)}$, a gradient vector $\vec{g}^{(n)} = -\nabla \mathcal{L}_1\{\vec{\sigma}^{(n)}\}$ and a search direction vector $\vec{h}^{(n)}$ where $n = 0, 1, 2 \ldots$ is an iteration index.

The CG is initialized by setting $\vec{\sigma}^{(0)} = \vec{\pi}$, and $\vec{h}^{(0)} = \vec{g}^{(0)}$ (i.e., the initial search direction is in the direction of the gradient). At each iteration the solution vector is updated using the recursion relation, $$\vec{\sigma}^{(n+1)} = \vec{\sigma}^{(n)} + \tau^{(n)}\vec{h}^{(n)}, \quad (10)$$

where $\tau$ is the step-size in the N-dimensional solution space and $\vec{h}$ is the step direction vector. At each iteration the step-size for the next iteration is determined from a line search, i.e., one makes the transformation $\pounds_1\{\vec{\sigma}^{(n)}\} \to \hat{\pounds}_1\{\vec{\sigma}^{(n)} + \tau\vec{h}^{(n)}\}$. The step-size for the (n+1)-th iteration is then obtained by solving the equation $$G(\tau) = \frac{\partial \hat{\pounds}_1}{\partial \tau} = 0. \quad (11)$$

Search directions are obtained from the following recursion relations:

$$\vec{h}^{(o)} = \vec{g}^{(o)}, \quad (12a)$$

$$\vec{h}^{(n)} = \vec{g}^{(n)} + \delta^{(n)}\vec{h}^{(n-1)}, \quad (12b)$$

$$\delta^{(n)} = \frac{(\vec{g}^{(n)} - \vec{g}^{(n-1)}) \cdot \vec{g}^{(n)}}{\vec{g}^{(n-1)} \cdot \vec{g}^{(n-1)}}, \quad (12c)$$

where n = 1, 2 ... in Eqs. 12b and 12c. The equation for $\delta^{(n)}$ is known as the Polak-Ribiere formula.

The CG algorithm is easily coded and implemented. As noted above, in higher conductivities (e.g., above 100 mS/m) and in high contrast zones, the Born approximation forward model can break down. In these cases we use a 1-D (neglecting invasion and borehole) forward model for each array which is a solution of Maxwell's equations in a medium discretized into an arbitrary number of vertical layers. The discretization depends on the array and for the results presented here we used 6-in. thick layers for ID and IM. Using the exact forward model is CPU intensive compared to the relatively simple Born model. In order to ease the computational burden one can use the Born approximation to compute the gradients (i.e., Jacobian matrix) of the forward response at each iteration. That is, in computing the gradients in Eqs. 12, one encounters terms of the form, $$-\frac{\partial \chi^2}{\partial \sigma_k} = 2 \sum_j \int_{-\infty}^{\infty} dz \left[ W_{j,R}(z) \frac{\partial Re\tilde{V}_j}{\partial \sigma_k} [ReR_j(z)] + W_{j,X}(z) \frac{\partial Im\tilde{V}_j}{\partial \sigma_k} [ImR_j(z)] \right], \quad (13)$$

where $Re\tilde{V}_j$ and $Im\tilde{V}_j$ are the computed R and X voltages, respectively. As noted by Dyos, the iterations can be speeded up by using the Born approximation to compute the gradients which in discretized form can be written $$\frac{\partial \tilde{V}_l^j}{\partial \sigma_k} = \Delta K_{k-l}^j, \quad (14)$$

where we have used Eq. 9. We use an adaptive Born approximation which selects for each array and for each tool position a background conductivity that depends on the previous iterate of the formation conductivity. In computing the residuals in Eq. 13 we use the exact forward model to compute the array response (i.e., $\tilde{V}_j(z)$). Thus the correct forward model is used in matching the measured response. The use of the Born approximation for the gradients simply reduces the efficiency of the optimization algorithm so that more iterations might be required for convergence, however, at a significantly reduced CPU time per iteration.

In spite of the decrease in CPU time achieved by using the approximation in Eq. 14, we found the CG algorithm too CPU intensive for practical use whenever an exact forward model is employed to compute the voltages in Eq. 13. A more efficient quasi-Newton algorithm based on the MEM Lagrangian $\pounds_2$ in Eq. 6 was developed for use with the exact forward model. The attractive feature of this algorithm is that convergence is achieved with only a few iterations. This algorithm has been recently applied by Minerbo to invert induction log data in dipping beds. Here, we briefly describe the algorithm. An exponential transformation, $$\sigma(z) = \pi \exp(q(z)), \quad (15)$$

is applied to the functional $\pounds_2$. The minimization of the transformed functional is done with respect to q(z). Note that the non-negativity of $\sigma(z)$ is guaranteed. From Eq. 6 it is easy to see that the transformed logarithmic smoothing term can be expressed as a quadratic form $(\vec{q}|H\vec{q})$ where H is the same matrix introduced in Eq. 7. The functional derivatives (i.e., Fréchet differential) of $\pounds_2$ with respect to $\sigma(z)$ and q(z) are simply related, i.e., $$\frac{\delta \pounds_2}{\delta q(z)} = \frac{\delta \pounds_2}{\delta \sigma(z)} \sigma(z). \quad (16)$$

A stationary point of the transformed functional $\pounds_2$ is obtained by setting each individual term in the functional derivative to zero. This leads to an overdetermined system of nonlinear equations. At each iteration the equations are linearized using a quasi-Newton method so that a system of linear equations in the deviations $\Delta q_l^n \equiv q_l^{(n+1)} - q_l^{(n)}$ is obtained. Here $q_l^{(n)}$ is the value of the function q(z) in the l-th pixel at the n-th iteration. The Fréchet derivatives of the entropy and logarithmic smoothing terms are linear in the deviations $\Delta q_l^n$ because of the transformation in Eq. 15. That is, one finds at the (n+1)-th iteration, on setting the derivatives to zero, linear equations of the form, $$\frac{\alpha}{T}\Delta q_l^n + \frac{\alpha}{T} q_l^{(n)} = 0, \quad (17)$$

from the entropy and $$\beta \sum_{m=1}^{N} H_{lm}\Delta q_m^n + \beta \sum_{m=1}^{N} H_{lm}q_m^{(n)} = 0, \quad (18)$$

from the logarithmic smoothing term. In the above equations the index l = 1, ..., N where N is the number of unknowns. Note that the factors $\alpha$ and $\beta$ in the above equations should not be canceled since they represent weighting factors in the least squares solution of the overdetermined system of equations. The remaining equations are obtained by setting the derivatives of the $\chi^2$ term (see Eq. 13) equal to zero. The resulting equations are linearized at each iteration by making a Taylor's series expansion, i.e., $$\tilde{V}_k^j\{q^{(n+1)}\} = \tilde{V}_k^j\{q^{(n)}\} + \sum_{m=1}^{N} \frac{\partial \tilde{V}_k^j}{\partial \sigma_m^{(n)}} \Delta q_m^n \sigma_m^{(n)}, \quad (19)$$

where we have used Eq. 16. One finds from Eqs. 13 and 19 a system of linearized equations for the j-th array which can be written in the form, $$\sum_{m=1}^{N} A^j_{lm} \Delta q_m{}^n = B^j_l, \quad (20)$$

where we have defined $$B^j_l = \sum_k \left[ W_{j,R} Re\left( \frac{\partial \bar{V}_k^j}{\partial \sigma_l^{(n)}} \right) Re(V_k^j - \bar{V}_k^j) + W_{j,X} Im\left( \frac{\partial \bar{V}_k^j}{\partial \sigma_l^{(n)}} \right) Im(V_k^j - \bar{V}_k^j) \right], \quad (21)$$

and $$A^j_{lm} = \sum_k \left[ W_{j,R} Re\left( \frac{\partial \bar{V}_k^j}{\partial \sigma_l^{(n)}} \right) Re\left( \frac{\partial \bar{V}_k^j}{\partial \sigma_m^{(n)}} \right) + W_{j,X} Im\left( \frac{\partial \bar{V}_k^j}{\partial \sigma_l^{(n)}} \right) Im\left( \frac{\partial \bar{V}_k^j}{\partial \sigma_m^{(n)}} \right) \right] \sigma_m^{(n)}. \quad (22)$$

Note that the summations over the index k in Eqs. 21 and 22 are in the data space whereas in Eqs. 18 and 20 the index m is in the solution space. The derivatives in Eqs. 21 and 22 can be approximated using Eq. 14. The linear system of overdetermined equations defined by Eqs. 17-18 and Eq. 20 is solved for the deviations $\Delta q_l^n$ at each iteration using a least squares band solver. We have found that the algorithm converges rapidly so that only a few iterations are usually needed. Using Eq. 15, one obtains from the $\Delta q_l^n$, the formation conductivities at each iteration, i.e., $$\sigma_l^{(n+1)} = \sigma_l^{(n)} \exp(\Delta q_l^n). \quad (23)$$

Inversion of Model Data

In this section, some results obtained from inversions of model data are presented. For the first set of results displayed in FIGS. 11-14 and FIG. 17, synthetic log data were created by convolving a chosen formation conductivity profile with a Doll vertical response function. The "Doll logs" thus generated were then inverted using the MEM Lagrangian £₁ in Eq. 1 and the Doll forward model. Note that the use of this simple forward model is appropriate here since the synthetic log data were generated from the same model. Its usefulness is that it provides a computationally simple model for illustrating the resolution and accuracy of the MEM.

Figure 15:
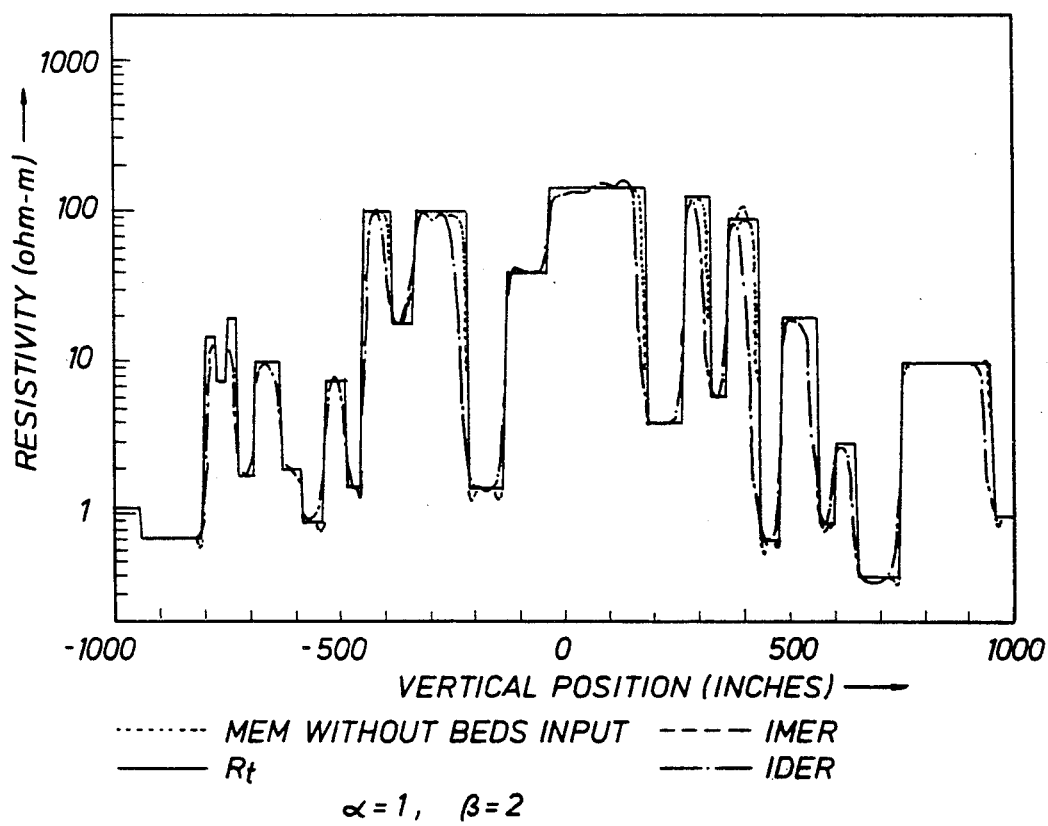
FIG. 15 illustrates maximum entropy inversion of induction deep plus induction medium using full forward model compared with enhanced resolution phasor processing.
Figure 16:
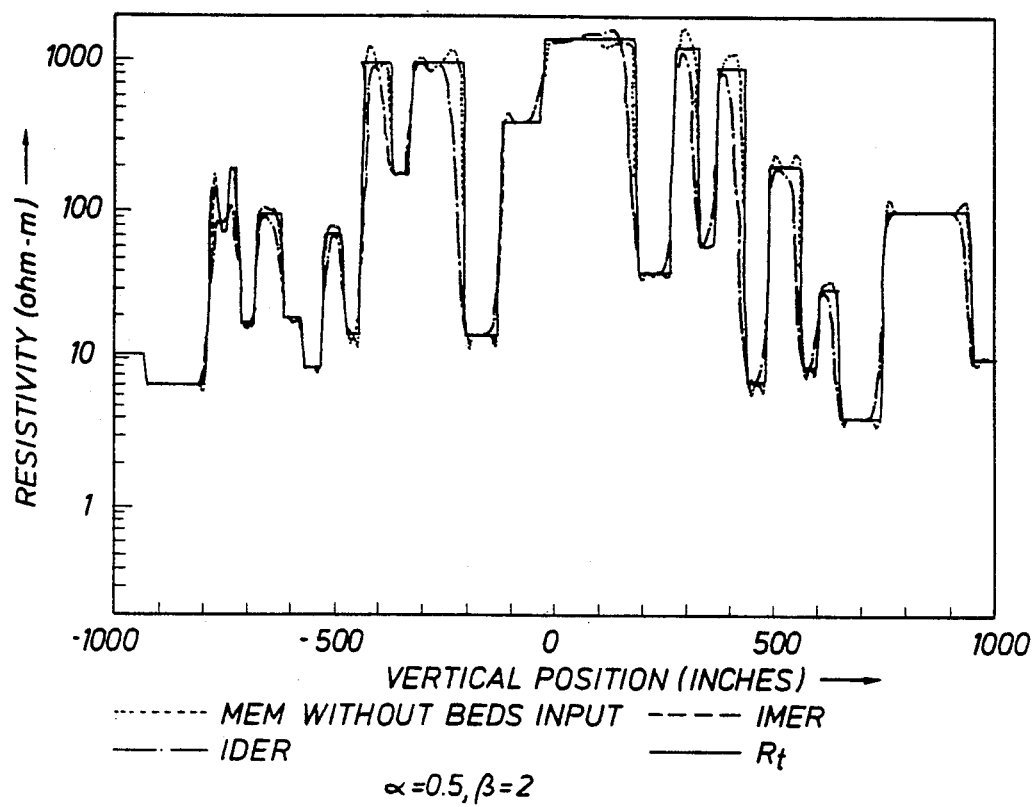
FIG. 16 illustrates maximum entropy inversion of induction deep plus induction medium using full forward model compared with enhanced resolution phasor.

For the second set of results, displayed in FIGS. 15-16, synthetic log data were created by computing the tool response for a chosen formation conductivity profile by solving Maxwell's equations for the 1-D layered medium. The synthetic logs thus generated were then inverted using the MEM Lagrangian £₂ in Eq. 6 assuming the exact 1-D forward model. For the invasion examples in FIGS. 18-20, the synthetic data were computed using an exact 2-D forward model and inverted assuming the exact 1-D forward model.

Figure 11:
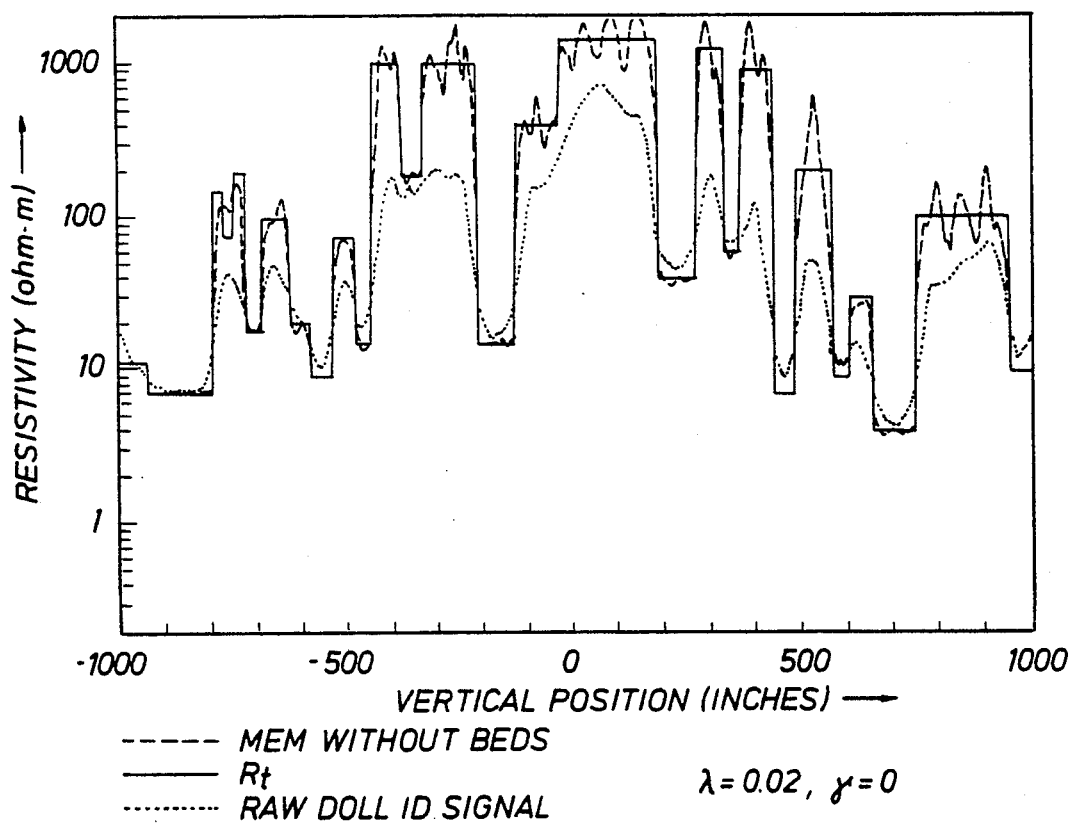
FIG. 11 illustrates maximum entropy inversion of induction deep (ID) without assuming knowledge of bed boundary positions.

In FIG. 11, we show the MEM inversion of a synthetic ID Doll log in the Oklahoma formation, a frequently used test problem. A similar result was obtained previously by Dyos. The spurious oscillations in the inverted log are due to error amplification at the ID blind frequencies. Note the excellent vertical resolution with the 2 ft beds near −800 in. being easily resolved.

Figure 12:
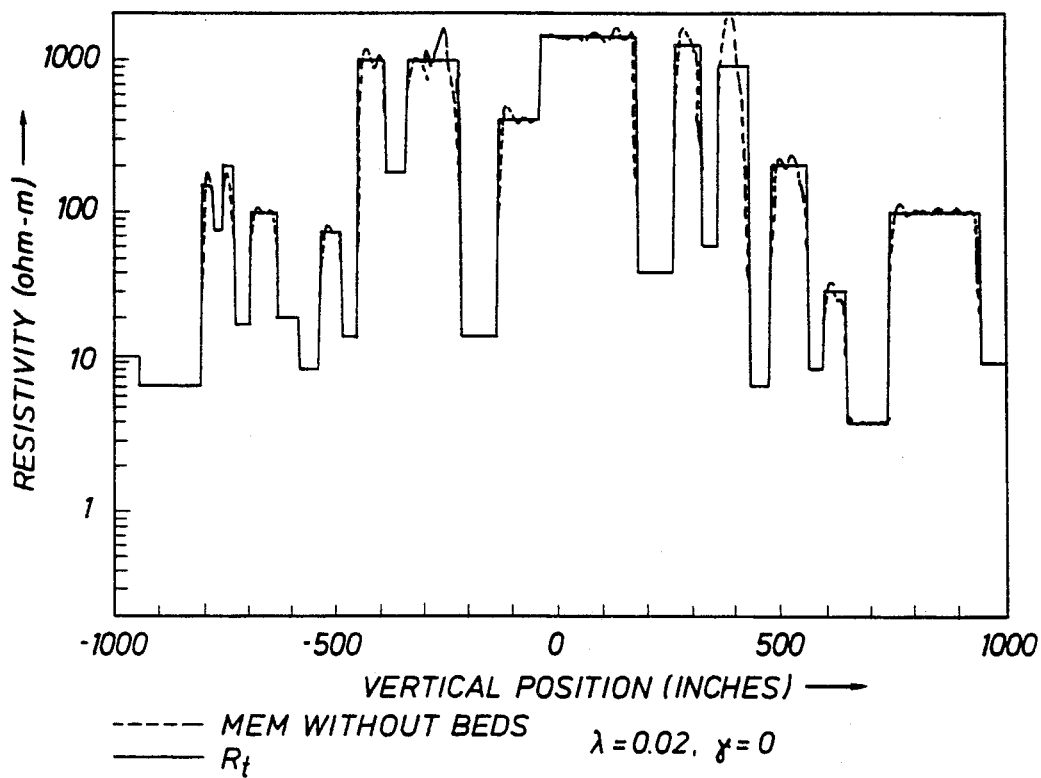
FIG. 12 illustrates maximum entropy inversion of induction medium plus induction deep logs without assuming knowledge of bed boundary positions.
Figure 13:
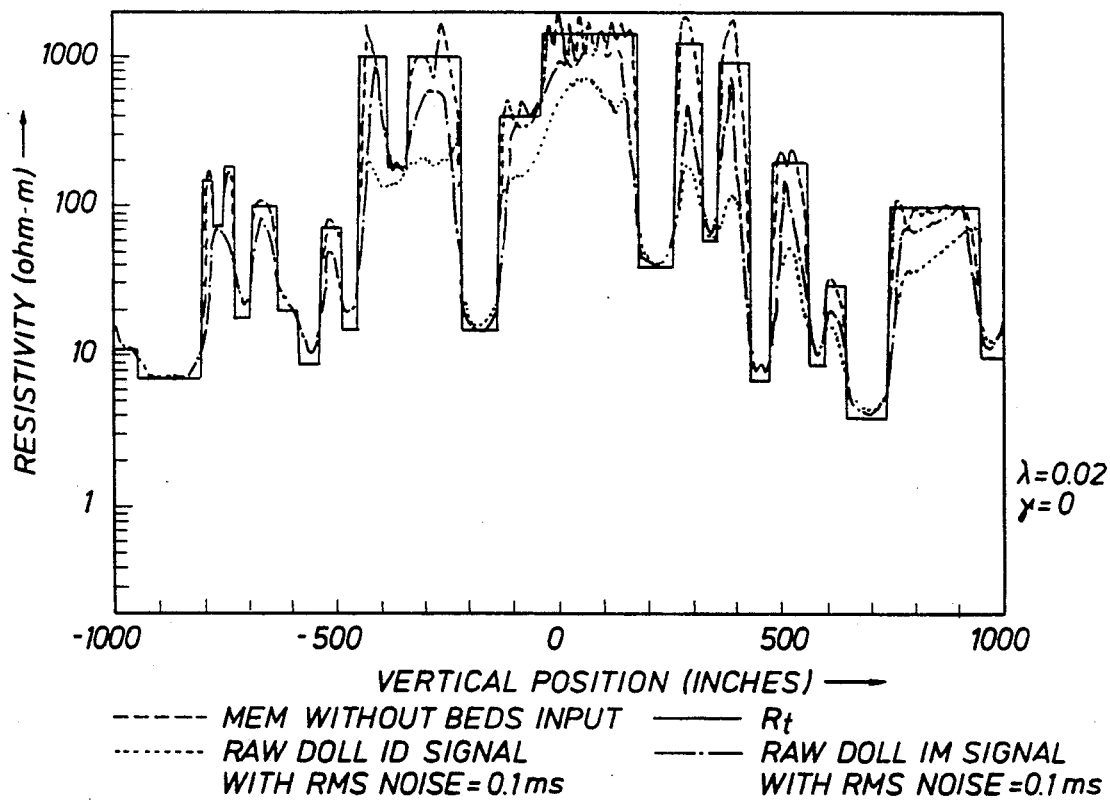
FIG. 13 illustrates maximum entropy inversion of induction medium plus induction deep logs in the presence of Gaussian white noise.
Figure 14:
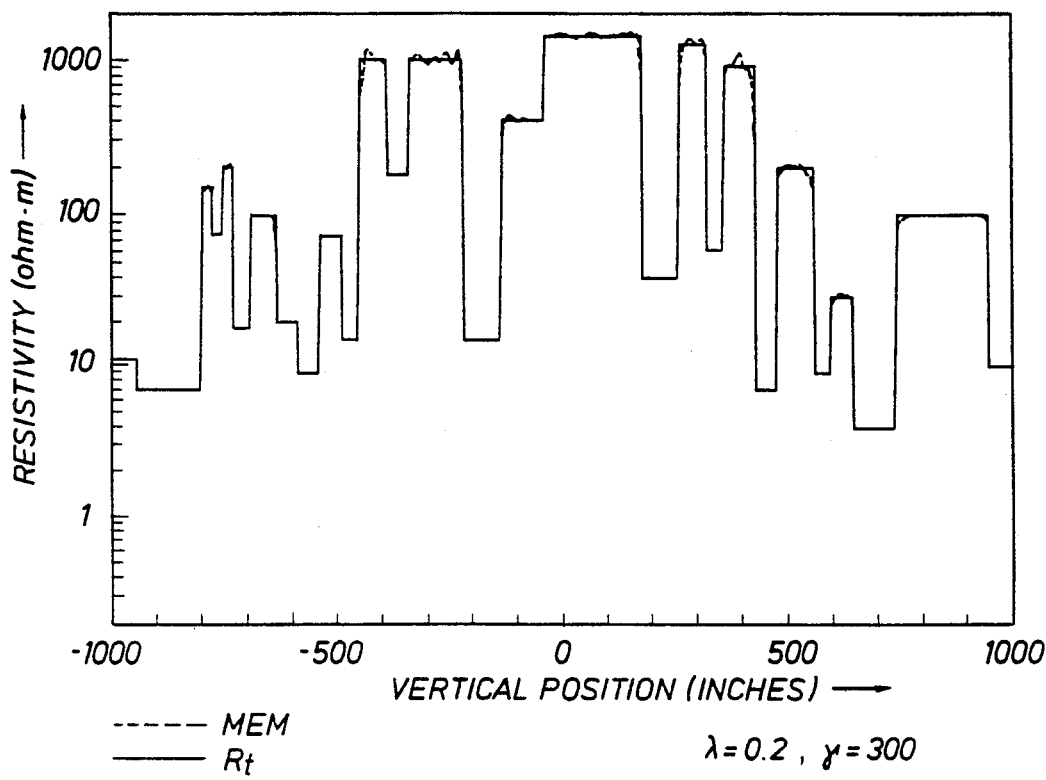
FIG. 14 illustrates maximum entropy inversion of induction medium plus induction deep logs assuming knowledge of bed boundary positions.

FIG. 12 shows a MEM inversion of the Oklahoma formation obtained by combining data from both the ID and IM arrays. Note that the blind frequency oscillations seen in FIG. 11 have been suppressed. The reason, of course, is that the IM array provides information at the blind frequencies so that the error amplification problem is eliminated. It should be noted that for the Array Induction Tool (AIT) the vertical response functions of the individual three coil arrays do not have blind frequencies. The MEM can therefore provide excellent inversions of single AIT array data. FIG. 13 shows the effect on the previous example of adding random noise to the input log data. We used normally distributed uncorrelated random errors with standard deviation 0.1 mS/m. Comparing FIGS. 12 and 13 demonstrate that the two inversions are practically identical with the effects of the noise evident only in the highest resistivity beds. In FIG. 14, is shown an inversion obtained by using a priori knowledge of the bed boundary positions in the Lagrangian £₁' which was added to the MEM Lagrangian in Eq. 1. Note that if exact bed boundary positions are known, an almost perfect inversion is obtainable.

In FIG. 15, is shown an inversion of ID plus IM data from the Oklahoma 2 formation derived from the Oklahoma formation in the previous examples by reducing the resistivities by a factor of ten. Note that MEM in FIG. 15 was obtained using the exact forward model. The MEM inversion can be seen to have "super resolution" approaching the Nyquist limit (i.e., limited only by the sampling rate). Note, however, that the MEM inversion can exhibit overshoots when the formation resistivity changes by several orders of magnitude over a 6-in. sample. This is evident in FIG. 15 in the lower resistivity beds. Note that the MEM inversion exhibits higher resolution than the Enhanced Resolution Phasor processed log (e.g., note the 2 ft beds at −800 in.). It is worth noting that Dyos' paper also presented a MEM inversion of the Oklahoma 2 formation. The reason that Dyos' inversions generally exhibit less resolution and accuracy than those in this specification is due, in part, to his use of an approximate forward model based on geometrical factors. This approach cannot properly treat the skin effect or deal with high-contrast formations where the conductivity profile changes by 2 to 3 orders of magnitude over a 6-in. data sample. In FIG. 16, a MEM inversion of the Oklahoma formation is compared with the Enhanced Resolution Phasor processed log. Note the superior resolution of the MEM inversion.

Figure 17:
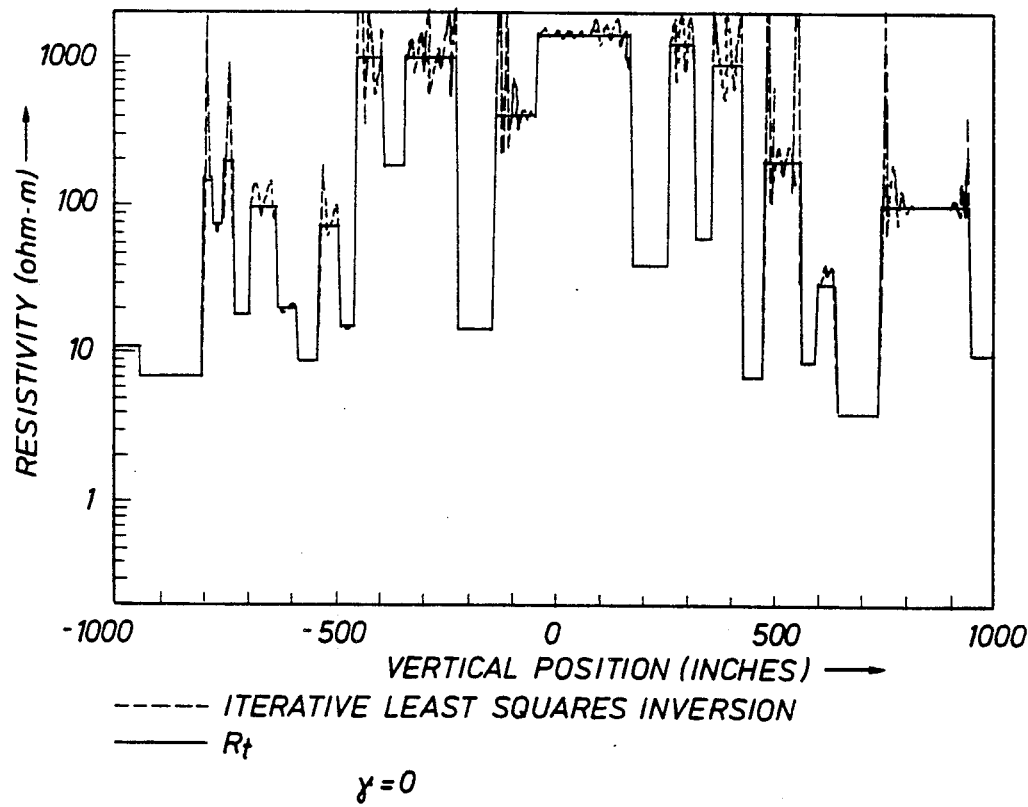
FIG. 17 illustrates iterative least squares inversion of induction deep plus induction medium without assuming knowledge of bed boundary positions.

In FIG. 17, is shown an iterative least squares solution obtained by removing the entropy term from Eq. 1 and using the CG optimization algorithm to minimize the $\chi^2$. Comparing FIG. 17 with FIG. 13 one can see that the least squares solution exhibits high frequency oscillations even in the absence of noise. Some improvement in the least squares inversion can be obtained by using regularization techniques to improve stability, however, we have found that least squares remains less robust and accurate than the MEM. The excellent stability and robustness of the MEM can be traced to the stabilizing influence of the entropy term. Maximum entropy prefers a smooth featureless formation conductivity profile and only permits structure in the profile to accommodate real structure in the raw data.

Figure 18:
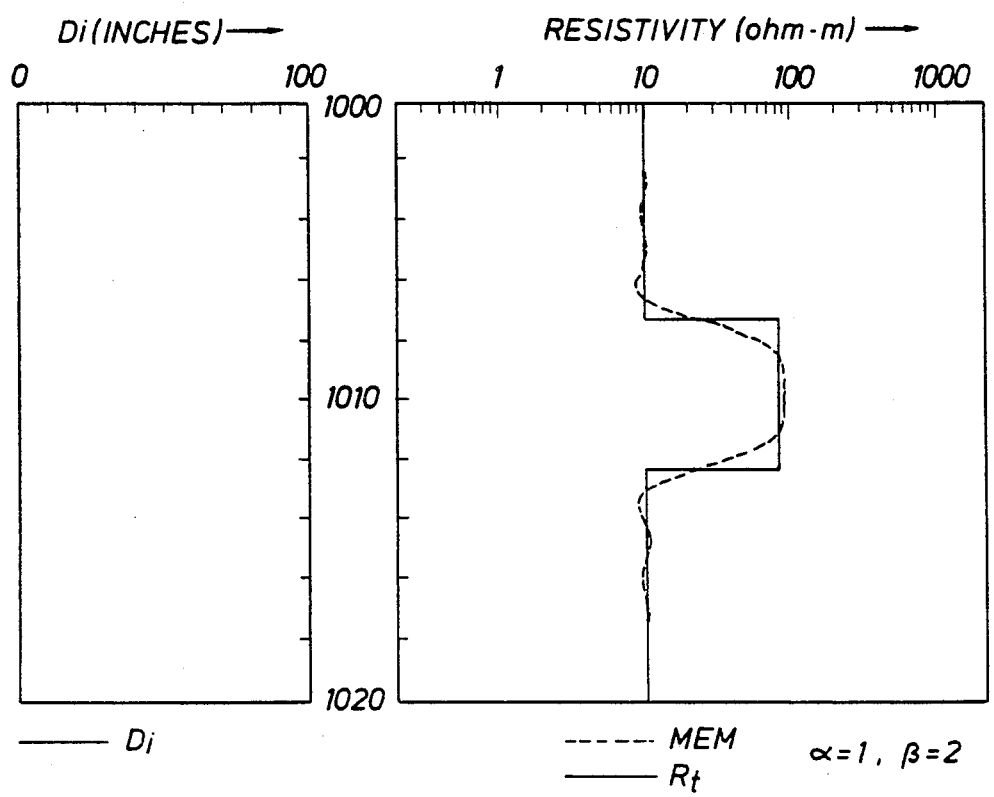
FIG. 18 illustrates maximum entropy inversion of induction deep in a non-invaded thin bed.
Figure 19:
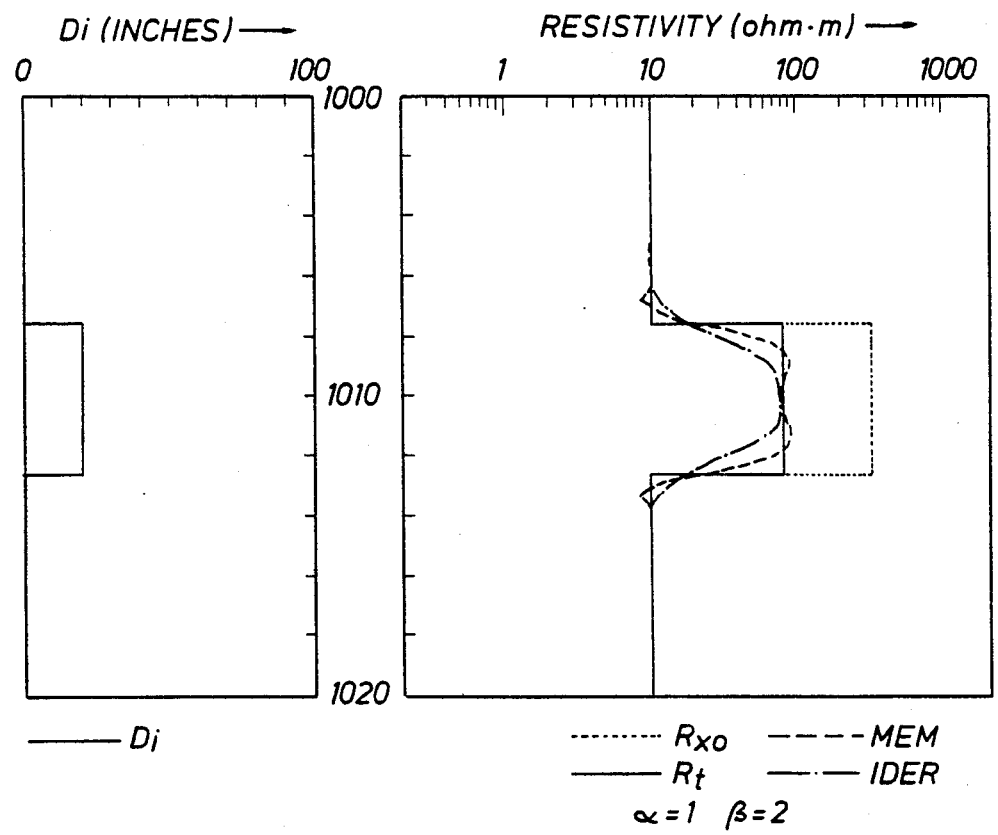
FIG. 19 illustrates maximum entropy inversion of induction deep plus induction medium in an invaded thin bed compared with an enhanced resolution phasor processed (IDER) log.
Figure 20:
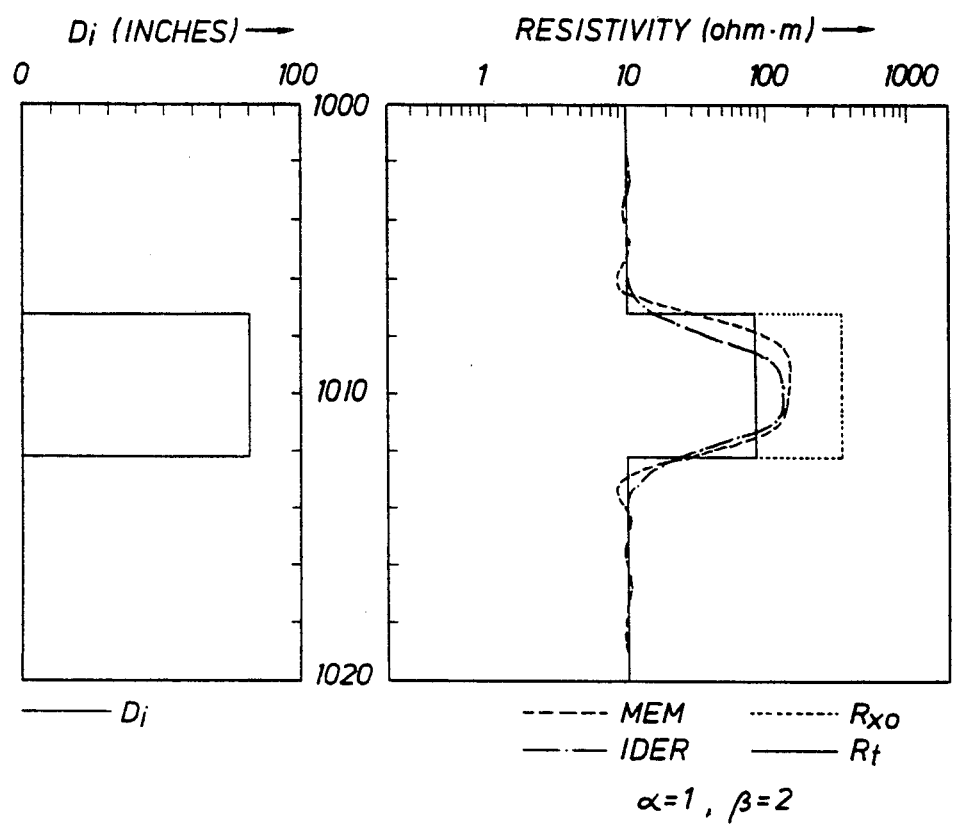
FIG. 20 illustrates maximum entropy inversion of induction deep in a deeply invaded thin bed compared with the enhanced resolution phasor processed (IDER) log.
Figure 21:
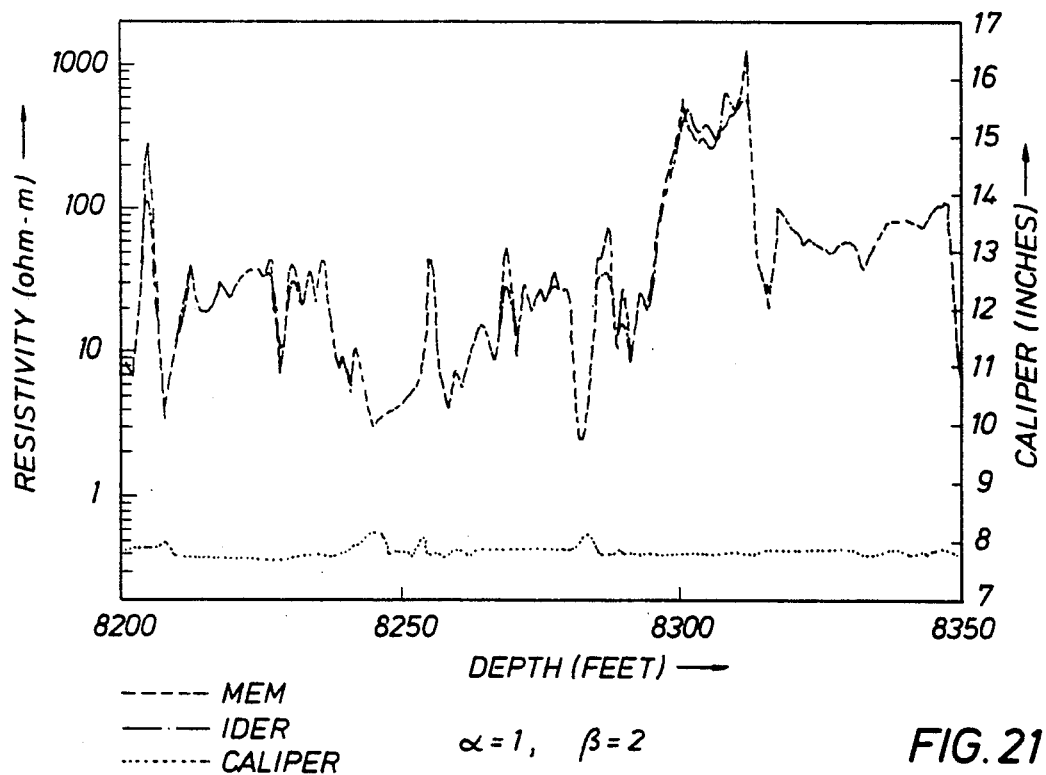
FIG. 21 illustrates maximum entropy inversion of a field example compared to enhanced resolution phasor processing.

Thus far, 2-D effects such as invasion have not been discussed. Here, we discuss a few examples to illustrate the effects of invasion on 1-D maximum entropy inversions. For these examples, the raw synthetic log data were generated using an exact forward model. The MEM inversions were done using an exact 1-D layered media forward model. The examples discussed here are identical to ones discussed previously by Barber in his paper on Enhanced Resolution Phasor processing. In FIG. 18, the MEM inversion of the ID array in a 5-ft bed is shown. Note that at the center of the bed the MEM inversion is close to $R_t = 80$ ohm-m but exhibits a slight overshoot. In FIG. 19, the MEM inversion of ID plus IM and the IDER Phasor processed log of the previous example with $D_i = 20$ in. of resistive invasion and $R_{xo} = 320$ ohm-m are shown. These two examples illustrate the stability and insensitivity of the ID MEM inversion to shallow resistive invasion. Note that even though the ID and IM arrays have different depths of investigation, combining the arrays in a 1-D inversion provides, at least for shallow invasion, improved inversions compared to single array processing. Also observe that the MEM inversion exhibits better resolution that the IDER processed log. FIG. 20 illustrates the effects of deep resistive invasion in a thin bed. Here the depth of invasion is comparable to the bed thickness. Note that both the MEM inversion and the IDER log read, as expected, resistivities which are higher than $R_t$ in the presence of deep resistive invasion. The resolution of the MEM inversions in the presence of deep invasion does not, however, appreciably degrade and remains better than the resolution exhibited by the IDER processed log.

Field Log Example

The prior examples were inversions of model data. In this section the results of processing field log data from a Phasor induction tool are presented and compared with IDER and SFL logs. The example represents an excellent environment for testing the resolution enhancement of induction log processing. The processed zone contains rapidly changing high contrast beds with thin strata also being present.

In the example the MEM inversion was obtained by combining data from both the ID and IM arrays. The example is from a carbonate well in Oklahoma. The drilling mud was a fresh waterbase mud with NaCl concentration approximately 3300 ppm corresponding to a mud conductivity of approximately 1.25 S/m at a measured bottom hole temperature of 153° F. The bit-size was 7⅛ in. and the hole was in reasonably good condition so that borehole effects are minimal. The well total measured depth is at 8542 ft.

Figure 22:
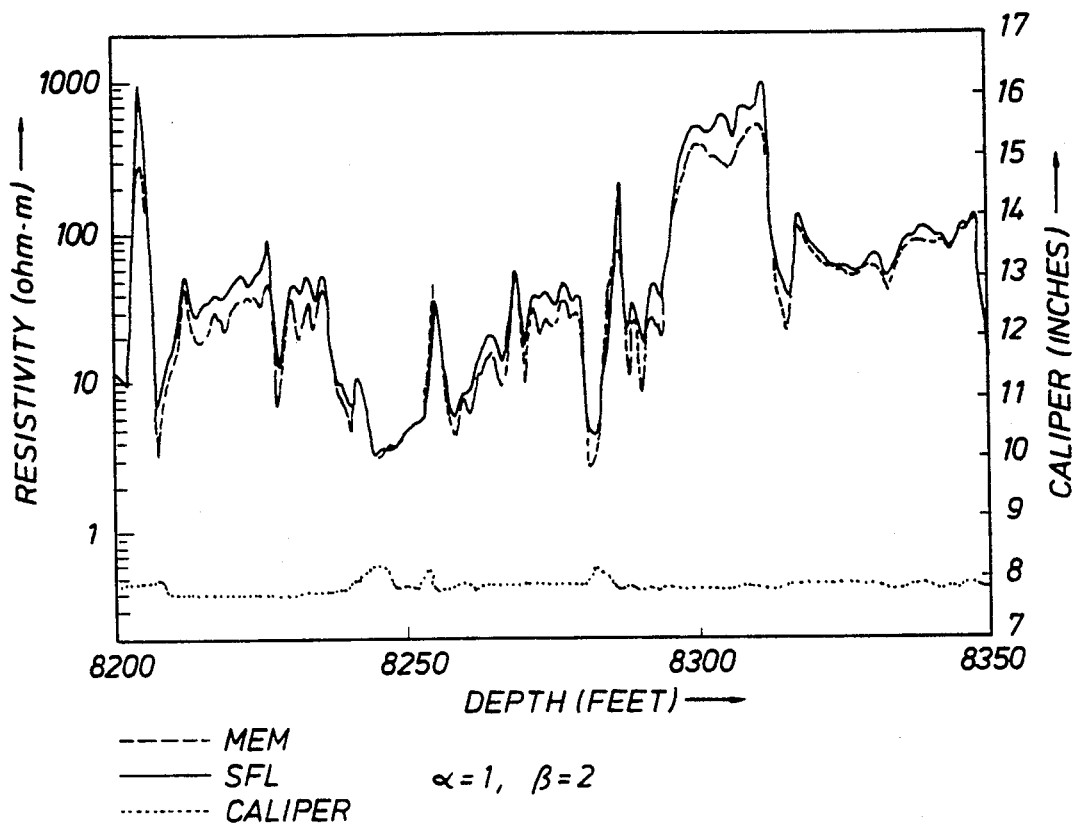
FIG. 22 illustrates maximum entropy inversion of a field example compared to the field log (SFL)

The comparison of the MEM and IDER logs is shown in FIG. 20. Note that the maximum entropy inversion generally exhibits, consistent with the model studies discussed earlier, better resolution than that obtainable with the IDER inverse filter. In particular note how quickly the MEM inversion can change, compared to IDER, to follow the rapidly changing high contrast formation resistivity profile. In FIG. 22, the maximum entropy inversion is compared to the SFL log. Note that the SFL log which has a vertical resolution of 2 ft or better, confirms the features seen on the maximum entropy inversion.

Consistency Check

Figure 23:
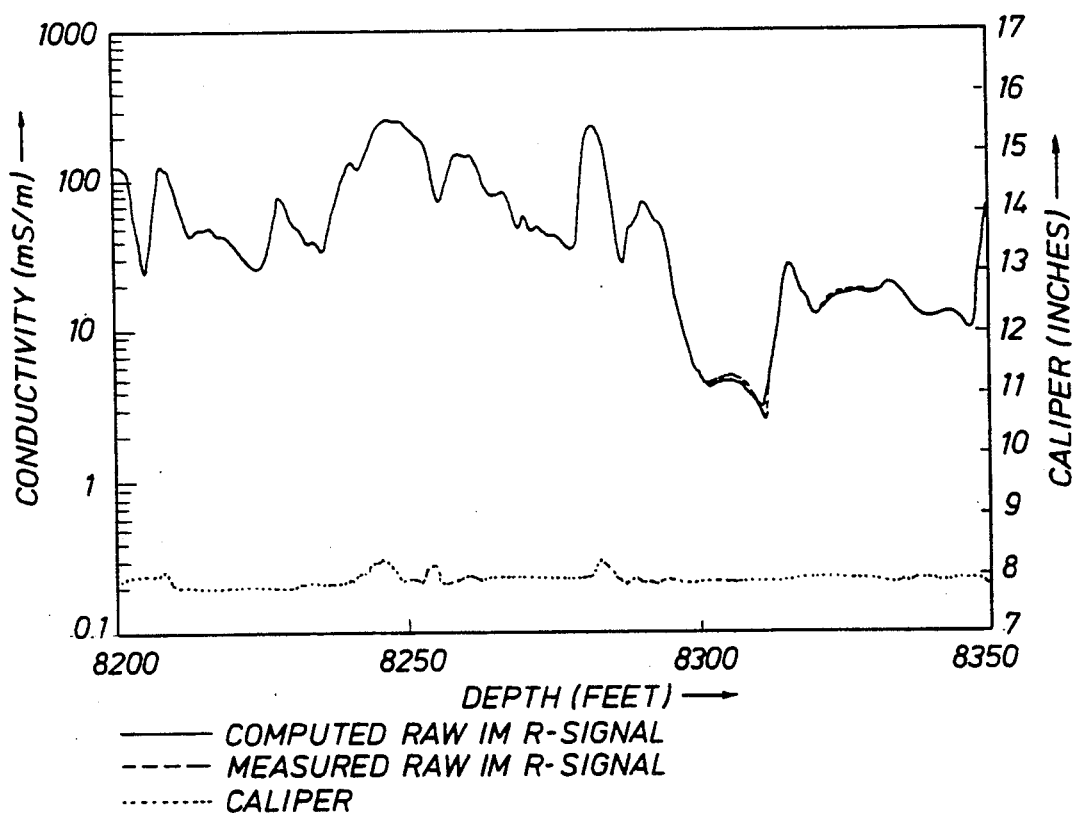
FIG. 23 illustrates comparison of computed and measured induction medium R-signals.
Figure 24:
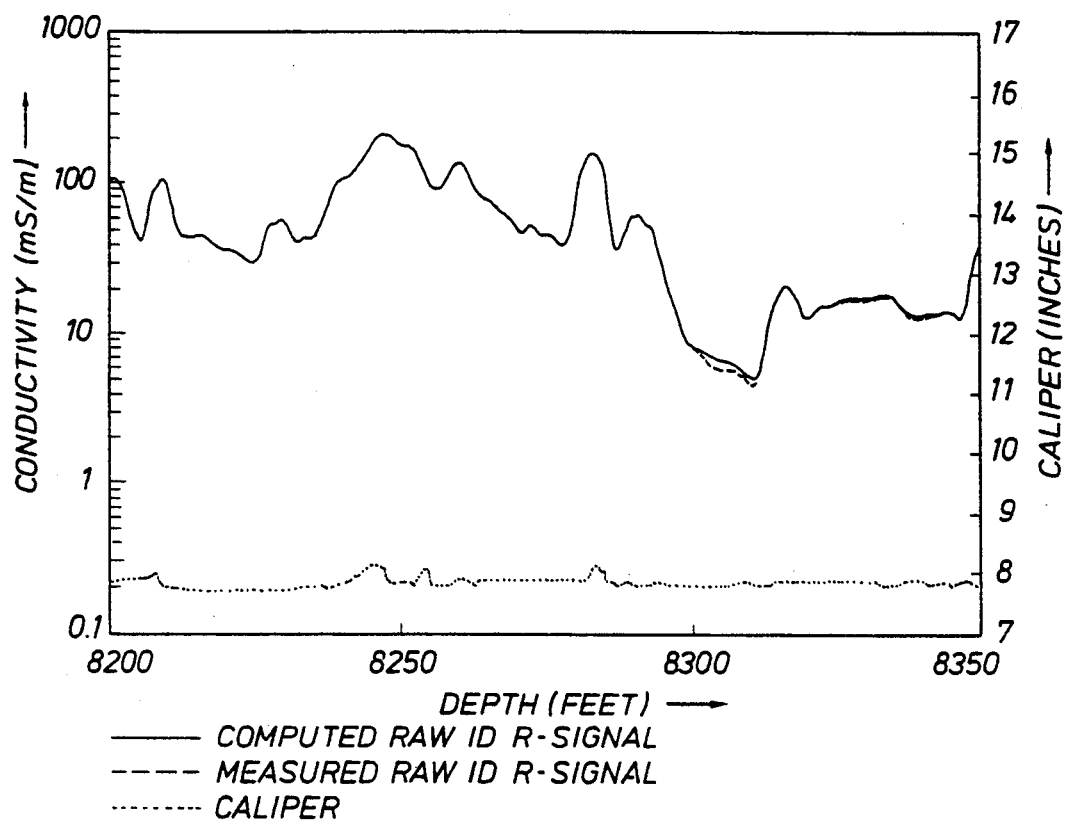
FIG. 24 illustrates comparison of computed and measured induction deep R-signals.

The MEM method iteratively determines the most probable formation conductivity distribution which is consistent with the measured log data. At each iteration theoretical logs are computed using the forward model and the conductivity distribution determined from the previous iteration. A consistency check on both the inversion and the forward model can be obtained by comparing the computed logs obtained on the last iteration (i.e., on convergence of the algorithm) with the input log data. Any significant discrepancies between the computed and measured logs in indicative of an inadequate forward model and/or invalid log data. For example invasion, dipping beds, borehole effects, sonde errors and other effects not accounted for in the forward model can result in a mismatch between the computed and measured logs. Thus, the consistency check can be used for diagnostic purposes. In FIGS. 23 and 24, comparisons of the computed and measured raw R-signals for the IM and ID array data from the field example are shown. The excellent agreement between the computed and measured R-signals for both arrays demonstrates that for this example the use of 1-D forward model is valid.

Figure 25:
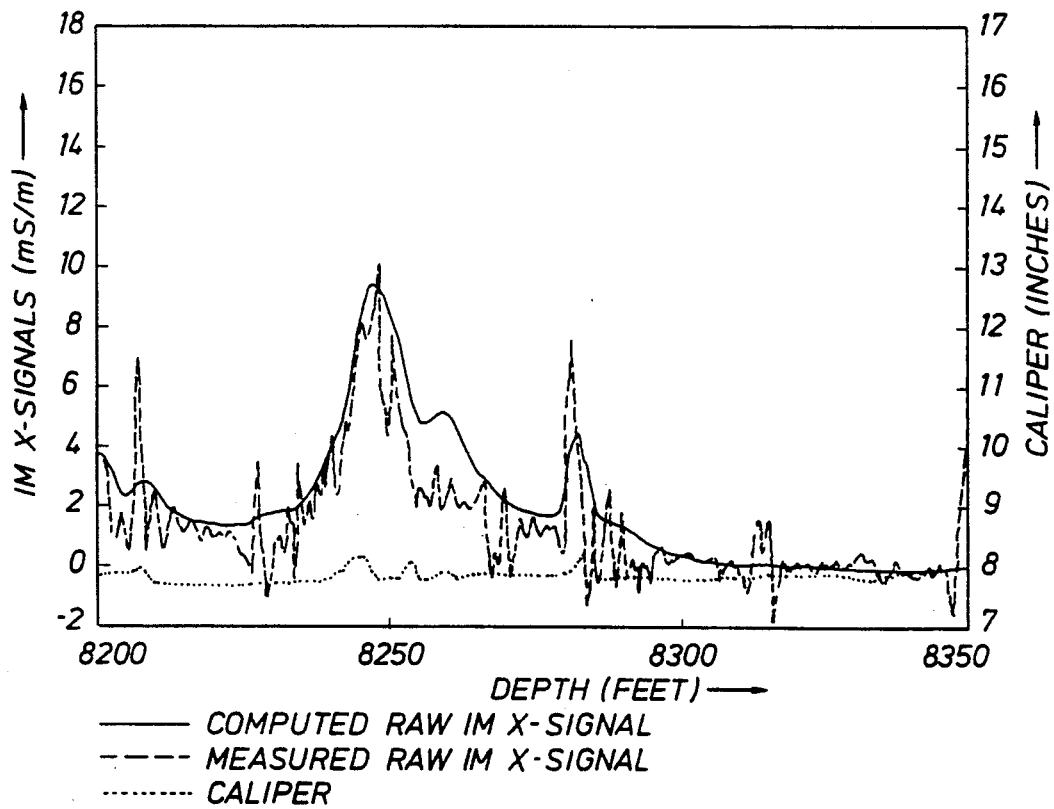
FIG. 25 illustrates comparison of computed and measured induction medium X-signals.
Figure 26:
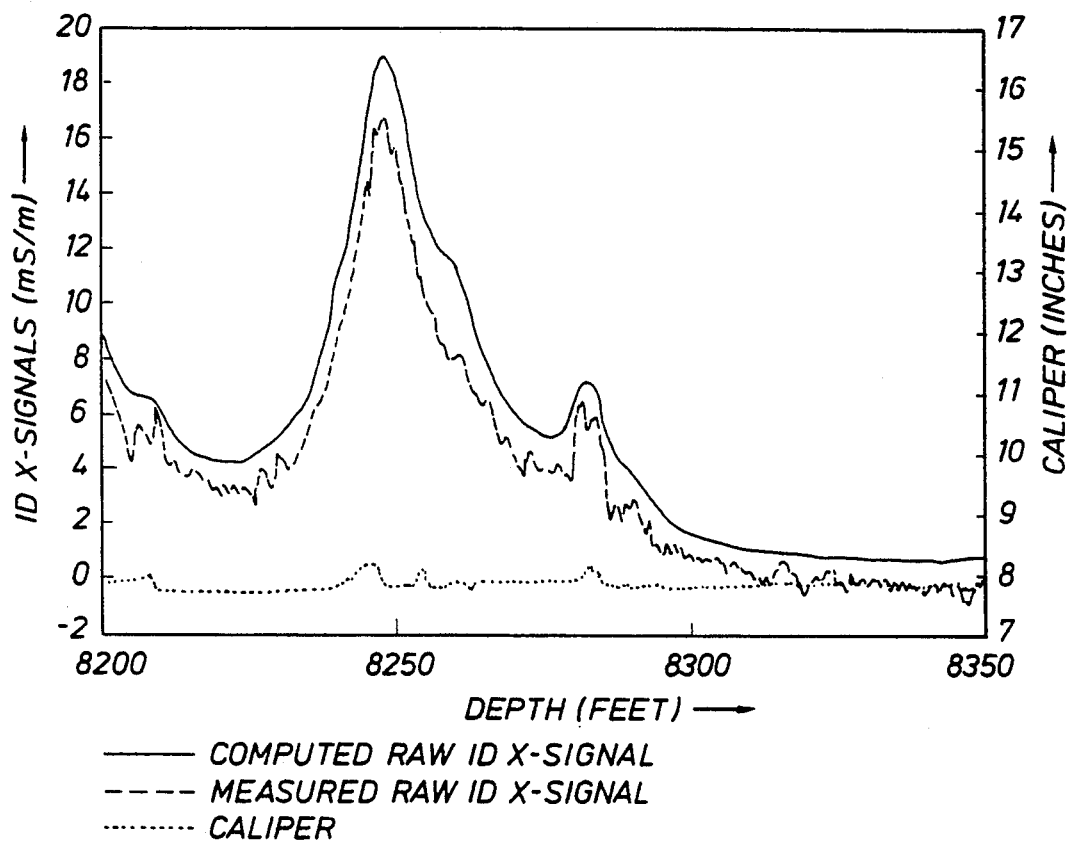
FIG. 26 illustrates comparison of computed and measured induction deep X-signals.

In FIGS. 25 and 26, comparisons of the computed and measured raw X-signals are shown for the ID and IM arrays, respectively. The agreement between the computed and measured X-signals for the IM array is not good as can be seen in FIG. 25. The nominal accuracy of the measured X-signal is about 1.0 mS/m. Only the gross features of the measured X-signal for the IM array which are due to formation conductivity changes (e.g., see FIG. 23) are present on the computed log. The high frequency oscillations and anomalies observed on the measured log are believed to be due to the presence of ferromagnetic minerals in this formation. In FIG. 26, observe that the gross structure of the computed and measured X-signals for ID are in good agreement, however, there appears to be approximately a 1 mS/m X-signal sonde error.

The high frequency oscillations observed on the measured ID X-signal are, as noted above, probably due to ferromagnetic minerals.

Conclusions

This specification has developed a new inversion technique for processing induction log data in order to obtain true formation resistivity profiles. The method is based on the principle of maximum entropy. The MEM inversions have been shown to provide vertical resolution and accuracy which exceeds that obtainable with state-of-the-art deconvolution filters. Accurate results can be obtained in very high conductivity and/or high contrast formations using the MEM with an exact forward model for the array responses. The method is iterative and provides as a byproduct, on convergence of the algorithm, synthetic logs which can be compared to the input log data to verify the validity of the $R_t$ profile obtained and/or the log data quality. The synthetic logs are computed with an exact forward tool model and the last iterate of the computed resistivity profile. The method is more computer intensive than deconvolution based on filters, however, it provides very high resolution and a better determination of $R_t$. The MEM inversions can provide more accurate determination of hydrocarbon reserves and the identification of thin hydrocarbon bearing strata which might otherwise be missed. In this specification, the MEM has been applied to inversion of log data from a Phasor induction tool, however, the method can easily be applied to an Array Induction Tool (AIT) to enhance vertical resolution. It can also easily be applied to inversion of subsets of multi-channel AIT data whereas the number of inverse filters needed for deconvolution of all possible subsets of AIT data is probably beyond practical limits. It is also obvious to one skilled in the art that this invention applies to the determination of any formation parameter profile and is in no way specific to the determination of a conductivity profile.

Nomenclature $\alpha \geq 0$: adjustable parameter multiplying the entropy term in the Lagrangian functional defined in Eq. 6.

$\beta \geq 0$: adjustable parameter multiplying the logarithmic smoothing term in the Lagrangian functional defined in Eq. 6.

$\gamma \geq 0$: adjustable smoothing parameter defined in Eq. 7.

$\delta(n)$: parameter in the CG method for determining the search direction at the n-th iteration as defined in Eq. 12c.

$\Delta$: data sample spacing. (m)

$\lambda$: Lagrange multiplier defined in Eq. 1.

$\pi(z)$: initial formation conductivity distribution as a continuous function of position. (mS/m)

$\vec{\pi}$: vector containing elements of discretized initial formation conductivity distribution. (mS/m)

$\sigma(z)$: 1-D formation conductivity distribution as a continuous function of position. (mS/m)

$\bar{\sigma}(z)$: formation background conductivity in Born approximation forward model as defined in Eq. 8. (mS/m)

$\sigma^{(n)}$: n-th iterate of vector containing elements ($\sigma_k$) of discretized formation conductivity distribution. (mS/m)

$\tau^{(n)}$: step-size for updating the conductivity distribution in the CG method at the (n+1)-th iteration as defined in Eq. 10.

$\chi^2\{\sigma(z)\}$: chi squared functional of the formation conductivity distribution as defined in Eq. 4.

$A_{lm}{}^j$: Matrix elements at n-th iteration in quasi-Newton algorithm defined in Eqs. 20 and 21.

$B_l{}^j$: vector at n-th iteration in quasi-Newton algorithm defined in Eq. 21.

$D_i$: diameter of invasion.

$\vec{g}^{(n)}$: gradient with respect to $\vec{\sigma}$ of the Lagrangian functional in Eq. 1 at the n-th iteration.

$\vec{h}^{(n)}$: search direction vector in the CG method at the n-th iteration.

$G(\tau)$: function whose zero determines the step-size in the CG method at each iteration (e.g., see Eq. 11).

H: real symmetric tridiagonal matrix (i.e., with elements $H_{mn}{}^j$ defined in Eq. 7) used to incorporate bed boundary information.

$K^j(z;\bar{\sigma})$: continuum response function used in Born approximation forward model defined in Eq. 8.

$K_{rl}{}^j$: discretized response function used in Born approximation forward model defined in Eq. 9.

$\pounds_1\{\sigma(z)\}$: standard maximum entropy method Lagrangian defined in Eq. 1.

$\pounds_2\{\sigma(z)\}$: new maximum entropy method Lagrangian defined in Eq. 6.

$\pounds_1'$: term to be added to $\pounds_1$ for incorporation of a priori knowledge of bed boundaries as defined in Eq. 7.

N: number of discretized formation conductivity elements (i.e., two per ft for 6-in. data sampling of Phasor induction tool) in the interval of interest.

$N_b$: number of beds to be used in $\pounds_1'$.

$N_f$: number of degrees of freedom in the data.

$N_j$: number of conductivity elements in j-th bed in Eq. 7.

$R_j(z)$: complex residual at measured depth z for j-th array as defined in Eq. 5.

$R_t$: true formation resisitivity. (ohm-m)

$R_{xo}$: invaded zone resistivity. (ohm-m)

$S\{\sigma(z)\}$: entropy functional defined in Eq. 2.

T: spatial integration of formation conductivity distribution as defined in Eq. 3. (mS)

$V_j(z)$: complex measured voltage from j-th array at measured depth z. (mS/m)

$\widetilde{V}_j(z)$: complex voltage from j-th array at measured depth z as computed from forward model. (mS/m)

$\widetilde{V}_{h,j}(\bar{\sigma})$: complex voltage from j-th array in a homogeneous medium with conductivity $\bar{\sigma}$ as computed from forward model (see Eq. 8). (mS/m)

$\widetilde{V}_l{}^j$: discretized complex voltage from j-th array at the l-th tool position as computed from forward model (i.e., see Eq. 14).

$W_{j,R}(z)$: weighting factor of R-signal in $\chi^2$ derived from variance in data of j-th array at measured depth z.

$W_{j,X}(z)$: weighting factor of X-signal in $\chi^2$ derived from variance in data of j-th array at measured depth z.

References

The following references are incorporated by reference into this specification:

1. Barber, T. D.: "Introduction to the Phasor Dual Induction Tool," JPT (September 1985) 1699–1706.
2. Moran, J. H. and Kunz, K. S.: "Basic Theory of Induction Logging and Application to Study of Two-Coil Sondes," Geophysics (1962) 27, No. 6, 829–858.
3. Barber, T. D.: "Induction Vertical Resolution Enhancement-Physics and Limitations," paper O presented at the 1988 SPWLA Ann. Logging Symp., San Antonio, June 5–8.
4. Thadani, S. G. and Merchant, G. A.: "Deconvolution With Propagated Geometric Factors," paper SPE 10986 presented at the 1982 SPE Ann. Tech. Conf. and Exhibition, New Orleans, September 26–29.
5. Lin, Y., Gianzero, S. and Strickland, R.: "Inversion of Induction Logging Data Using the Least Squares Technique," paper AA presented at the 1984 SPWLA Logging Symp., New Orleans, June 10–13.
6. Freedman, R. and Vogiatzis, J. P.: "Theory of Induced Polarization Logging in a Borehole," Geophysics (1986) 51, No. 9, 1830–1849.
7. Shannon, C. E. and Weaver, W.: *The Mathematical Theory of Communication*, The University of Illinois Press (1949).
8. Gull, S. F. and Daniell, G. J.: "Image Reconstruction From Incomplete And Noisy Data," Nature (1978) 272, No. 20, 686–690.
9. Burch, S. F., Gull, S. F., and Skilling, J.: "Image Reconstruction By A Powerful Maximum Entropy Method," Computer Vision, Graphics and Image Processing (1983) 23, 113–128.
10. Wernecke, S. J. and D'Addario, L. R.: "Maximum Entropy Image Reconstruction," IEEE Transactions On Computers (1977) C-26, No. 4, 351–364.
11. Frieden, B. R.: "Restoring With Maximum Likelihood and Maximum Entropy," Jour. of the Optical Soc. of America (1972) 62, No. 4, 511–518.

12. Frieden, B. R.: "Statistical Models for The Image Restoration Problem," Computer Graphics And Image Processing (1980) 12, 40–59.
13. Dyos, C. J.: "Inversion of the Induction Log By the Method of Maximum Entropy," paper T presented at the 1987 SPWLA Ann. Logging Symp., London, June 29–July 2.
14. Dyos, C. J.: "Inversion of Well Log Data by the Method of Maximum Entropy," paper H presented at the 10th European Logging Symposium, April 1986.
15. Twomey, S.: *Introduction to the Mathematics of Inversion in Remote Sensing and Indirect Measurements*, Elsevier Scientific Publishing Co. (1977), pp. 124–125.
16. Fletcher, R.: *Practical Methods of Optimization*, Vol. 1, John Wiley and Sons (1980).
17. Minerbo, G. N.: "Inversion of Induction Logs in Dipping Beds," Jour. of Electromagnetic Waves and Applications, to be published.
18. Lawson, C. L. and Hanson, R. J.: *Solving Least Squares Problems*, Prentice-Hall, Inc. (1974).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus responding to voltage signal data developed by a well tool when said well tool is disposed in a borehole for generating a conductivity profile and for recording said conductivity profile on an output record medium, comprising:
   receiving means for receiving said voltage signal data and determining an initial estimate of said conductivity profile;
   model voltage determination means responsive to said initial estimate of said conductivity profile for determining model voltages corresponding to said initial estimate of said conductivity profile;
   conductivity profile update means responsive to said model voltages and to said initial estimate of said conductivity profile for determining an incremental value (delta) and updating said initial estimate of said conductivity profile in accordance with said incremental value and producing an updated conductivity profile;
   convergence testing means for determining if said updated conductivity profile when compared with said initial estimate of said conductivity profile satisfies a convergence test criterion; and
   recording means for recording said updated conductivity profile on said output record medium when said updated conductivity profile satisfies said convergence test criterion.

2. The apparatus of claim 1, wherein a linear system has a left side including a matrix ($A_{lm'}$) and said incremental value (delta) and a right side ($B_l$), and wherein said conductivity profile update means further comprises:
   matrix determination means for determining said matrix of said linear system as a function of said model voltages and said initial estimate of said conductivity profile;
   right side determination means for determining said right side of said linear system as a function of said model voltages and said initial estimate of said conductivity profile; and
   solver means responsive to said matrix determined by said matrix determination means and said right side determined by said right side determination means for determining said incremental value of said linear system, said conductivity profile update means using said incremental value to update said initial estimate of said conductivity profile to determine said updated conductivity profile which is recorded on said output record medium by said recording means when said updated conductivity profile satisfies said convergence test criterion.

3. The apparatus of claim 1, wherein, when said updated conductivity profile fails to satisfy said convergence test criterion:
   said convergence testing means sets said initial estimate of said conductivity profile equal to said updated conductivity profile to produce a new initial estimate of said conductivity profile;
   said model voltage determination means determines new model voltages corresponding to said new initial estimate of said conductivity profile;
   said conductivity profile update means determines a new incremental value in response to said new model voltages and said new initial estimate of said conductivity profile and updates said new initial estimate of said conductivity profile in accordance with said new incremental value to produce a new updated conductivity profile;
   said convergence testing means determines if said new updated conductivity profile when compared with said new initial estimate of said conductivity profile satisfies said convergence test criterion; and
   said recording means records said new updated conductivity profile on said output record medium when said new updated conductivity profile satisfies said convergence test criterion.

4. A well logging system including a well tool adapted to be in a borehole and an apparatus for use connected to the well tool, said well tool including a plurality of receivers where the receivers collectively develop voltage signal data, said apparatus being adapted to respond to said voltage signal data developed by a well tool when said well tool is disposed in said borehole for generating an updated conductivity profile and for recording said updated conductivity profile on an output record medium, said apparatus comprising:
   receiving means for receiving said voltage signal data and determining an initial estimate of said conductivity profile;
   model voltage determination means responsive to said initial estimate of said conductivity profile for determining model voltages corresponding to said initial estimate of said conductivity profile;
   conductivity profile update means responsive to said model voltages and to said initial estimate of said conductivity profile for determining an incremental value (delta) and updating said initial estimate of said conductivity profile in accordance with said incremental value and producing said updated conductivity profile, said conductivity profile update means including,
   matrix determination means for determining a matrix ($A_{lm'}$) of a linear system as a function of said model voltages and said initial estimate of said conductivity profile, where said linear system has a left side including said matrix ($A_{lm}^j$) and said incremental value (delta) and a right side ($B_l^j$), right side determination means for determining said right side ($B_l^j$) of said linear system as a function of said model voltages and said initial estimate of said conductivity profile, and solver means responsive to said matrix determined by said matrix determination means and said right side determined by said right side determination means for determining said incremental value (delta) of said linear system;

convergence testing means for determining if said updated conductivity profile when compared with said initial estimate of said conductivity profile satisfies a convergence test criterion; and recording means for recording said updated conductivity profile on said output record medium when said updated conductivity profile satisfies said convergence test criterion.

5. The well logging system of claim 4, wherein, when said updated conductivity profile fails to satisfy said convergence test criterion:

said convergence testing means sets said initial estimate of said conductivity profile equal to said updated conductivity profile to produce a new initial estimate of said conductivity profile;

said model voltage determination means determines new model voltages corresponding to said new initial estimate of said conductivity profile;

said conductivity profile update means determines a new incremental value in response to said new model voltages and said new initial estimate of said conductivity profile and updates said new initial estimate of said conductivity profile in accordance with said new incremental value to produce a new updated conductivity profile;

said convergence testing means determines if said new updated conductivity profile when compared with said new initial estimate of said conductivity profile satisfies said convergence test criterion; and said recording means records said new updated conductivity profile on said output record medium when said new updated conductivity profile satisfies said convergence test criterion.

6. A method of determining a desired updated conductivity profile associated with a formation traversed by a borehole and recording said desired updated conductivity profile on an output record medium, said desired updated conductivity profile being determined from voltage signal data developed by a well tool when said well tool is disposed in said borehole, comprising the steps of:

(a) repeatedly determining an initial estimate of said conductivity profile of said formation from said voltage signal data and producing a plurality of initial estimates of said conductivity profile;

(b) determining model voltages associated with each of said initial estimates of said conductivity profile;

(c) determining an incremental value (delta) as a function of each of said model voltages and each of the initial estimates of said conductivity profile;

(d) updating each of the initial estimates of said conductivity profile using the respective incremental values determined during the determining step (c) to perform the updating step and producing a plurality of updated conductivity profiles;

(e) testing to determine which one of said plurality of updated conductivity profiles, when compared with the respective plurality of initial estimates of said conductivity profiles, satisfies a convergence test criteria, the one updated conductivity profile which satisfies the convergence test criteria being said desired updated conductivity profile; and (f) recording said desired updated conductivity profile on said output record medium.

7. The method of claim 6, wherein the determining step (c) comprises the steps of:

(g) determining a matrix A of a linear system corresponding to each of the model voltages and each of the initial estimates of said conductivity profile, where the linear system has a left side including said matrix A and said incremental value (delta) and a right side B;

(h) determining said right side B of said linear system corresponding to each of the model voltages and each of the initial estimates of said conductivity profile; and (i) determining said incremental value (delta) corresponding to each said matrix A determined during the determining step (g) and each said right side B determined during the determining step (h).

* * * * *

UNITED STATES PATENT AND TRADEMARK OFFICE
CERTIFICATE OF CORRECTION

PATENT NO. : 5,210,691

DATED : May 11, 1993

INVENTOR(S) : Freedman et al

It is certified that error appears in the above-identified patent and that said Letters Patent is hereby corrected as shown below:

Column 20,

Claim 4, line 2, change "adapted to be" to -- for use --; and change "for use" to -- adapted to be --.

Signed and Sealed this

Sixteenth Day of August, 1994

Attest:

BRUCE LEHMAN

Attesting Officer

Commissioner of Patents and Trademarks